United States Patent
Akiyama

(10) Patent No.: US 6,694,235 B2
(45) Date of Patent: Feb. 17, 2004

(54) VEHICULAR RELAY DEVICE, IN-VEHICLE COMMUNICATION SYSTEM, FAILURE DIAGNOSTIC SYSTEM, VEHICLE MANAGEMENT DEVICE, SERVER DEVICE AND DETECTION AND DIAGNOSTIC PROGRAM

(75) Inventor: Susumu Akiyama, Kariya (JP)

(73) Assignee: Denso Corporation, Kariya (JP)

( * ) Notice: Subject to any disclaimer, the term of this patent is extended or adjusted under 35 U.S.C. 154(b) by 39 days.

(21) Appl. No.: 10/179,685

(22) Filed: Jun. 26, 2002

(65) Prior Publication Data

US 2003/0009271 A1 Jan. 9, 2003

(30) Foreign Application Priority Data

Jul. 6, 2001 (JP) .................................... 2001-206164
Jul. 31, 2001 (JP) .................................... 2001-231673

(51) Int. Cl.$^7$ .............................................. G06F 19/00
(52) U.S. Cl. .............................. 701/33; 701/35; 701/32; 455/418; 455/424
(58) Field of Search ............................. 701/1, 33, 29, 701/35, 32, 31; 455/418, 423, 424, 507; 340/426.16; 711/101, 100

(56) References Cited

U.S. PATENT DOCUMENTS 6,028,537 A * 2/2000 Suman et al. ............... 340/988
6,148,179 A * 11/2000 Wright et al. ............... 455/66.1
6,181,994 B1   1/2001 Colson et al. ................ 701/33
6,542,739 B1 * 4/2003 Garner ........................ 455/427
6,611,755 B1 * 8/2003 Coffee et al. ................ 701/213
2002/0052847 A1 * 5/2002 Shioda et al. ................ 705/51

FOREIGN PATENT DOCUMENTS

| JP | A-62-245341 | 10/1987 |
|----|-------------|---------|
| JP | A-7-264315  | 10/1995 |
| JP | A-9-315272  | 12/1997 |
| JP | A-10-194095 | 7/1998  |
| JP | A-11-345118 | 12/1999 |
| JP | A-2000-029843 | 1/2000 |

* cited by examiner

Primary Examiner—Thomas G. Black
Assistant Examiner—Ronnie Mancho
(74) Attorney, Agent, or Firm—Posz & Bethards, PLC

(57) ABSTRACT

A gateway ECU identifies a requested ECU from a plurality of ECUs through a LAN based on an access request of an external device for requesting access to the requested ECU and determines whether the external device has been authorized to access the ECUs based on first authentication information of the external device. Furthermore, the gateway ECU determines whether a trouble of the vehicle currently exists based on data transmitted from each ECU through the LAN. If the trouble exists, the gateway identifies a failed part, which causes the current trouble in the vehicle, based on information transmitted from each corresponding ECU by executing a detection and diagnostic program obtained from a customer server.

24 Claims, 11 Drawing Sheets

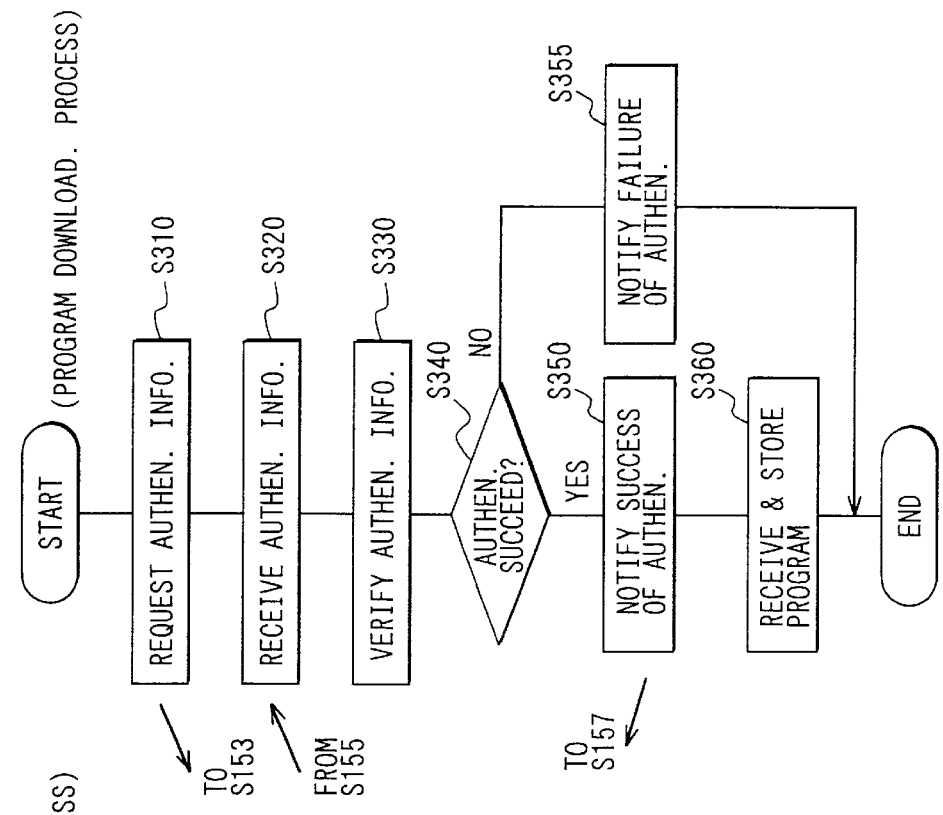
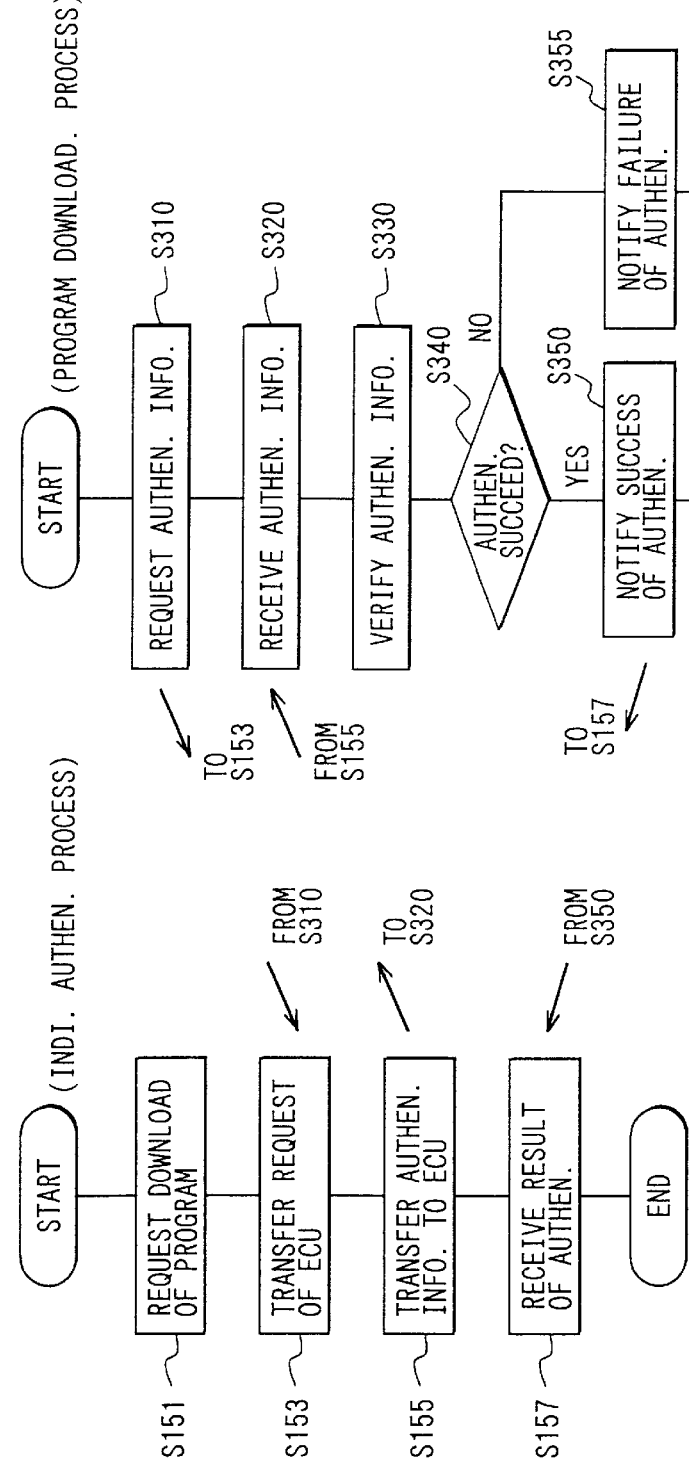

VEHICULAR RELAY DEVICE, IN-VEHICLE COMMUNICATION SYSTEM, FAILURE DIAGNOSTIC SYSTEM, VEHICLE MANAGEMENT DEVICE, SERVER DEVICE AND DETECTION AND DIAGNOSTIC PROGRAM

CROSS REFERENCE TO RELATED APPLICATION

This application is based on and incorporates herein by reference Japanese Patent Application No. 2001-206164 filed on Jul. 6, 2001 and Japanese Patent Application No. 2001-231673 filed on Jul. 31, 2001.

BACKGROUND OF THE INVENTION

1. Field of the Invention

The present invention relates to a vehicular relay device, which relays communication between an external device located outside a vehicle and various in-vehicle electronic devices, and also relates to a failure diagnostic system of the vehicle.

2. Description of Related Art

In recent years, in vehicles (particularly, automobiles), the number of in-vehicle electronic devices, such as control devices, information devices and audio devices, has been increasing. Furthermore, many in-vehicle electronic devices, which require cooperation with other in-vehicle electronic devices or share information with other in-vehicle electronic devices, are interconnected through dedicated communication lines to construct an information communication network (i.e., in-vehicle LAN) to allow transmission and reception of information among the in-vehicle electronic devices.

Furthermore, in recent years, external network systems, which are located outside the vehicle, have made notable progress. With the progress of the external network systems, infrastructures, which allow in-vehicle devices to obtain necessary information from outside the vehicle, are developed. With the advent of such infrastructures, many in-vehicle devices, each of which has a radio communication device capable of communicating with the external devices, are connected to the in-vehicle LAN.

One example of such an in-vehicle device is a vehicle navigation system. The vehicle navigation system may be connected to a vehicle information and communication system (VICS) radio communication device capable of receiving traffic information supplied from a VICS. The vehicle navigation system may be also connected to a cellular phone capable of obtaining, for example, nearby store information through the internet or the like. Another example is an in-vehicle electronic toll collection (ETC) device connected to an ETC radio communication device. The ETC radio communication device is capable of communicating with an ETC system located outside the vehicle.

In the previously proposed in-vehicle LANs, the radio communication device, through which various external information is received, is directly connected to the device, which primarily uses that particular external information. This will result in various disadvantages. For example, in one case, the radio communication device cannot be placed to a desired location in the vehicle. In another case, an extra communication line (wiring) is required to connect the radio communication device to the corresponding device.

To address these disadvantages, it is conceivable to directly connect the radio communication device to the in-vehicle LAN, so that the device, which is placed in the LAN and needs information received through the radio communication device, can obtain the information through the radio communication device and the LAN. In this way, the greater freedom can be achieved in terms of positioning of the radio communication device in the vehicle, and the number of communication lines can be advantageously reduced.

However, with such an arrangement, each device connected to the in-vehicle LAN can be accessed from outside the vehicle through the radio communication device. Thus, it causes various disadvantages, such as one similar to unauthorized access to a network terminal, which is often seen lately in the internet service.

Furthermore, in recent years, considerable progress has been made in the field of mechatronics in connection with progress in the field of electronics, such as the advent of high performance microprocessors. As part of the progress in the field of mechatronics, various in-vehicle computer systems are provided in vehicles, such as automobiles. Such an in-vehicle computer system is provided to achieve an improvement in resource saving, energy saving, driving performance, safety, comfort and the like and is installed in an engine/drive system, a running/safety system, an entertainment system and the like.

If a failed part of the vehicle cannot be properly identified with such an in-vehicle computer system or electronic control unit, it may cause a problem (in the worst case, the vehicle cannot be run). Thus, a failure detection program for detecting a failure of each subject apparatus (subject to be controlled by the corresponding electronic control unit) is provided in the electronic control unit to improve reliability of detection of a failed part. That is, operations of the computers and sensors are periodically and automatically checked. If a failure of the subject apparatus is detected, corresponding information, such as a diagnostic code (e.g., SAE code), is stored in the electronic control unit.

In this way, a service technician can read the information, such as the diagnostic code stored in the electronic control unit, through a diagnostic tool to identify the failed part.

In the above failure detection, the individual failure detection program is executed in each electronic control unit, and thus the failure detection is generally carried out on an individual electronic control unit basis.

However, in recent years, the various electronic control units are interconnected through the in-vehicle network system to achieve collaborative operation with other electronic control units in the vehicle.

Thus, a trouble in the collaborative operation between the electronic control units could occur, and a failed part, which causes such a trouble in the collaborative operation, cannot be identified with the information obtained through the execution of the failure detection program provided on the individual electronic control unit basis.

Furthermore, the identification of the failed part, which causes the trouble, requires expert knowledge since the collaborative operation of the electronic control units is involved. Thus, it is difficult to identify the failed part through the conventional approach of using the information, such as the diagnostic code, obtained through the diagnostic tool, which is connected to the corresponding electronic control unit. As a result, even if the vehicle is brought into a service station or an automobile dealer, repair work of the vehicle sometimes requires a relatively long period of time.

SUMMARY OF THE INVENTION

The present invention addresses the above disadvantages. Thus, it is an objective of the present invention to effectively restrain unauthorized access to in-vehicle electronic devices while reducing wiring in an in-vehicle communication system. It is another objective of the present invention to effectively identify a trouble in collaborative operation between electronic control devices, which are interconnected through an in-vehicle network, and to quickly identify a failed part that causes the trouble.

To achieve the objectives of the present invention, there is provided a vehicular relay device, which is located between an in-vehicle LAN and a communication device that performs data communication with an external device located outside of a vehicle. The in-vehicle LAN is arranged in the vehicle and is connected with a plurality of in-vehicle electronic devices. The vehicular relay device relays communication between the external device and the in-vehicle electronic devices. The vehicular relay device includes a first identifying means, a first authenticating means and a first delivering means. The first identifying means identifies a requested in-vehicle electronic device from the in-vehicle electronic devices based on an access request for requesting access to the requested in-vehicle electronic device upon reception of the access request from the external device and determines whether the access request requires authentication of the external device based on a result of identification of the requested in-vehicle electronic device. The first authenticating means determines whether the external device has been authorized to access the in-vehicle electronic devices based on first authentication information, which is transmitted from the external device, when the first identifying means determines that the access request requires the authentication of the external device. The first delivering means delivers communication data transmitted from the external device through the communication device to the requested in-vehicle electronic device when the first authenticating means determines that the external device has been authorized to access the in-vehicle electronic devices or when the first identifying means determines that the access request requires no authentication of the external device.

To achieve the objectives of the present invention, there is further provided an in-vehicle communication system including the in-vehicle LAN, the communication device and the vehicular relay device described above.

To achieve the objectives of the present invention, there is also provided a failure diagnostic system including a plurality of electronic control devices and a vehicle management device. The electronic control devices are interconnected through an in-vehicle network. Each electronic control device stores a failure detection program, which is executed to detect a failure of a vehicle during control operation of a controlled apparatus controlled by the electronic control device. The vehicle management device communicates with the electronic control devices through the in-vehicle network to manage the failure of the vehicle. The vehicle management device includes a trouble determining means for determining whether a trouble of the vehicle currently exists, a program obtaining means for obtaining a corresponding detection and diagnostic program corresponding to the current trouble, a failed part identifying means for identifying a failed part, which causes the current trouble in the vehicle, and an information outputting means for outputting failure information relevant to the failed part. The trouble determining means determines whether the trouble of the vehicle currently exists based on data transmitted from each electronic control device through the in-vehicle network. The program obtaining means obtains the corresponding detection and diagnostic program corresponding to the current trouble when the trouble determining means determines that the trouble of the vehicle currently exists. The corresponding detection and diagnostic program is previously prepared to handle the current trouble. The failed part identifying means identifies the failed part based on information transmitted from each corresponding electronic control device by executing the corresponding detection and diagnostic program obtained by the program obtaining means. The execution of the corresponding detection and diagnostic program, in turn, causes execution of an associated process in each corresponding electronic control device, so that the information is outputted from each corresponding electronic control device to the failed part identifying means. The information outputting means outputs the failure information relevant to the failed part based on a result obtained through operation of the failed part identifying means.

To achieve the objectives of the present invention, there is further provided a server device, which constitutes part of a failure diagnostic system. The failure diagnostic system also includes a plurality of electronic control devices and a vehicle management device. The electronic control devices are interconnected through an in-vehicle network, and each electronic control device stores a failure detection program, which is executed to detect a failure of a vehicle during control operation of a controlled apparatus controlled by the electronic control device. The vehicle management device communicates with the electronic control devices through the in-vehicle network to manage the failure of the vehicle. The server device includes a storage means, which stores a plurality of detection and diagnostic programs each linked to its relevant trouble information indicative of one of troubles of the vehicle. When an inquiry information, which includes current trouble information indicative of a current trouble of the vehicle, is received from the vehicle management device, the server device searches for a corresponding detection and diagnostic program stored in the storage means based on the current trouble information and transmits the corresponding detection and diagnostic program to the vehicle management device. The vehicle management device executes the corresponding detection and diagnostic program to cause execution of an associated process in each corresponding electronic control device, so that information is outputted from each corresponding electronic control device to the vehicle management device, and a failed part, which causes the current trouble of the vehicle, is identified by the vehicle management device based on the information of each corresponding electronic control device.

To achieve the objectives of the present invention, there is also provided a detection and diagnostic program executed in a vehicle management device, which constitutes part of a failure diagnostic system. The failure diagnostic system also includes a plurality of electronic control devices, which are interconnected through an in-vehicle network. Each electronic control device stores a failure detection program, which is executed to detect a failure of a vehicle during control operation of a controlled apparatus controlled by the electronic control device. The vehicle management device communicates with the electronic control devices through the in-vehicle network to manage the failure of the vehicle. The detection and diagnostic program includes an instruction for executing an associated process in each corresponding electronic control device, so that information is outputted from each corresponding electronic control device to the vehicle management device. The detection and diagnostic program also includes an instruction for identifying a failed part of the vehicle based on the information of each corresponding electronic control device.

BRIEF DESCRIPTION OF THE DRAWINGS

The invention, together with additional objectives, features and advantages thereof, will be best understood from the following description, the appended claims and the accompanying drawings in which:

FIG. 4A is a flow chart showing an individual authenticating process executed by the gateway ECU of the first embodiment;

FIG. 4B is a flow chart showing a program downloading process executed by a requested ECU of the first embodiment;

DETAILED DESCRIPTION OF THE INVENTION (First Embodiment)

A first embodiment of the present invention will be described with reference to the accompanying drawings.

Figure 1:
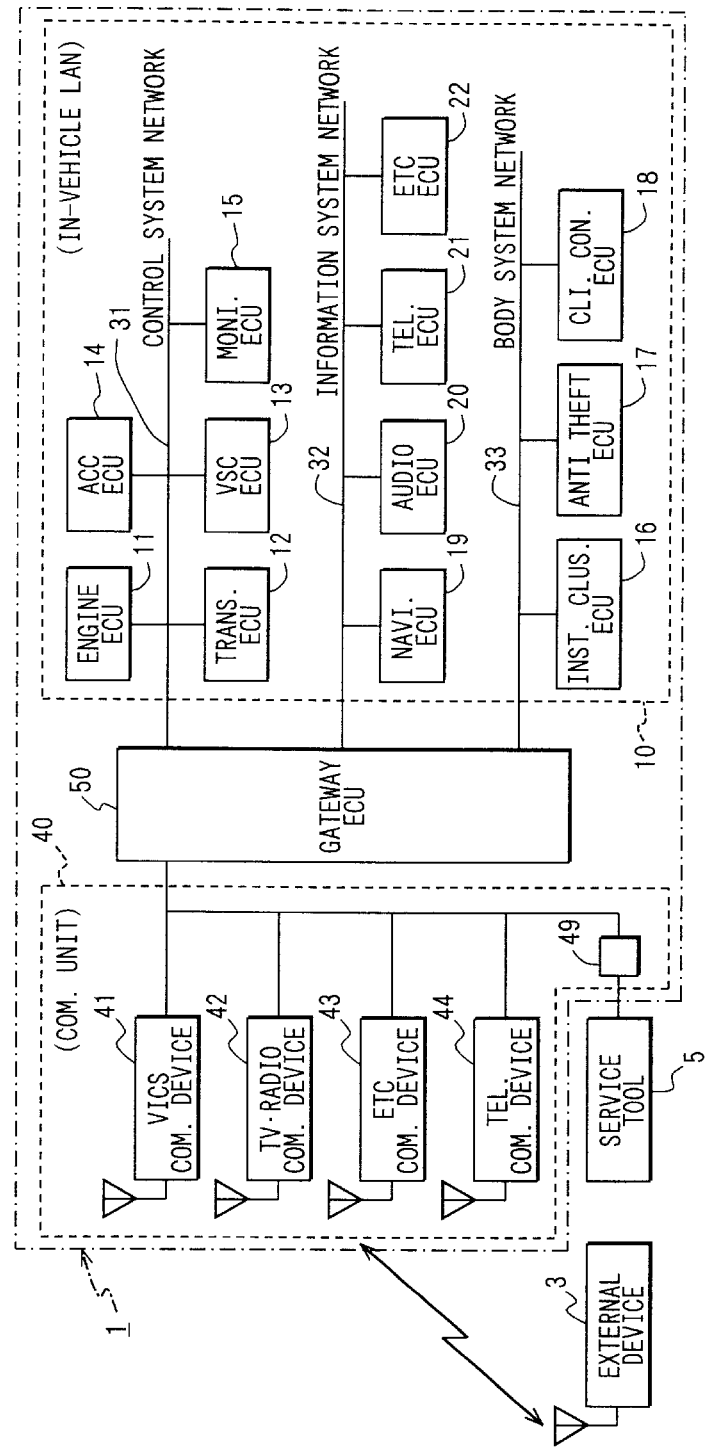
FIG. 1 is a block diagram showing a structure of an in-vehicle communication system of a first embodiment of the present invention.

FIG. 1 is a block diagram showing a structure of an in-vehicle communication system 1 according to the present embodiment.

As shown in FIG. 1, the in-vehicle communication system 1 of the present embodiment includes an in-vehicle LAN 10, a communication unit 40 and a gateway ECU (vehicular relay device or vehicle management device) 50. The in-vehicle LAN 10 includes a plurality of electronic control units (ECUs 11–22), which are arranged in a vehicle and act as in-vehicle electronic devices of the present invention. The communication unit 40 communicates with an external device 3, which is located outside the vehicle. The gateway ECU 50 is placed between the in-vehicle LAN 10 and the communication unit 40 and relays data communications between each ECU 11–22 and the external device 3.

The in-vehicle LAN 10 includes a control system network 31, an information system network 32 and a body system network 33. In each network, a group of ECUs are connected to a common transmission line. For example, vehicle controlling ECUs relevant to driving of the vehicle, such as an engine ECU 11, a transmission ECU 12, a VSC ECU 13, an ACC ECU 14 and a surrounding area monitoring ECU 15, are connected to the control system network 31.

The engine ECU 11 is an engine control device that performs control of an engine. The transmission ECU 12 is a transmission control device that performs shift control of an automatic transmission. These ECUs 11, 12 are classified as power train system control devices. The VSC ECU 13 is a control device that performs attitude control and brake control of the vehicle. The ACC ECU 14 is a driving control device that controls the vehicle to follow a vehicle in front of it. These ECUs 11, 12, 13, 14 are classified as vehicle driving system control devices.

Body controlling ECUs, such as an instrument cluster ECU 16, an antitheft ECU 17 and a climate control ECU 18, are connected to the body system network 33. The instrument cluster ECU 16 controls display of various states of the vehicle, such as a vehicle speed, an engine speed, a door position (e.g., closed or opened) and a shift range of the transmission on display devices. The antitheft ECU 17 monitors a condition of the vehicle. For example, if an unauthorized person enters the vehicle or tries to steal a device from the vehicle, the antitheft ECU 17 turns on alarm sounds or makes an emergency call to an external center. The climate control ECU 18 controls an air conditioning system of the vehicle.

Information system ECUs, such as a navigation ECU 19, an audio ECU 20, a telephone ECU 21 and an ETC ECU 22, are connected to the information system network 32. The information system ECUs are classified as information devices that provide various information (for example, through display of the information, replay of the information or the like).

The navigation ECU 19 obtains map data from a map data storage (not shown), such as a DVD player or a CD player, which is connected to the navigation ECU 19. Furthermore, the navigation ECU 19 obtains information relevant to a current vehicle position from a GPS receiver (not shown), which is connected to the communication unit 40. Then, the navigation ECU 19 displays a map, which indicates the current vehicle position, on a display device (not sown), such as a liquid crystal display device, which is connected to the audio ECU 20.

Furthermore, the navigation ECU 19 obtains traffic jam information, for example, from a VICS radio communication device 41, which will be described later. Then, the navigation ECU 19 displays the traffic jam information on the display device along with the map. Also, the navigation ECU 19 obtains information indicative of a location of an ETC gate through an ETC radio communication device 43 and displays this information on the display device to indicate the location of the ETC gate to a driver.

The audio ECU 20 follows a command inputted by the user through an operation switch connected to the audio ECU 20. The audio ECU 20 obtains a radio program or television program specified by the user through a television program and radio program receiving radio communication device 42 by controlling a tuner provided in the television program and radio program receiving radio communication device 42. Then, the audio ECU 20 plays the radio program or television program through a speaker system or the crystal liquid display device.

The telephone ECU 21 communicates with a telephone radio communication device 44 to connect the telephone radio communication device 44 to an external device, which is connected to a telephone line through a radio base station of a telephone line network. Then, the telephone ECU 21 allows the communication between each ECU of the in-vehicle LAN 10 and the external device through the telephone line.

The ETC ECU 22 obtains toll fee information from an ETC center through an ETC radio communication device 43 (described later). Then, the ETC ECU 22 retrieves various information, for example, from a card reader connected to the ETC ECU 22 and transmits the information to the external ETC center through the ETC radio communication device 43.

With reference to FIG. 1, the communication unit 40 includes radio communication devices, such as the VICS radio communication device 41, the television program and radio program receiving radio communication device 42, the ETC radio communication device 43 and the telephone radio communication device 44. The communication unit 40 further includes an external device interface 49, which directly connects an external device, such as a service tool 5, to the devices in the vehicle.

The VICS radio communication device 41 includes a radio beacon receiver or light beacon receiver, for example, for receiving the traffic information from the VICS. Communication data received from the VICS through the radio beacon receiver or light beacon receiver is outputted from the VICS radio communication device 41 to the gateway ECU 50.

The television program and radio program receiving radio communication device 42 includes the tuner for receiving television broadcasting signals or radio broadcasting signals. The tuner is controlled by the audio ECU 20 connected to the in-vehicle LAN 10. The television program and radio program receiving radio communication device 42 receives a command from the audio ECU 20 and is connected to the external center, which provides a video on demand service. Data, such as visual data, obtained from the external center is outputted from the radio communication device 42 to the gateway ECU 50.

The ETC radio communication device 43 is a radio communication device that communicates with the ETC center. Communication data received from the ETC center is outputted from the ETC radio communication device 43 to the gateway ECU 50. Furthermore, the ETC radio communication device 43 transmits data, which is received from the in-vehicle LAN 10 through the gateway ECU 50, to the ETC center.

The telephone radio communication device 44 is controlled by the telephone ECU 21 and is connected to the external public telephone line network through the radio base station. Then, the telephone radio communication device 44 outputs the communication data, which is received through the public telephone network, to the gateway ECU 50.

Exemplary accesses from outside the vehicle through the telephone radio communication device 44 include the following ones.

One exemplary access is an access from a vehicle owner who transmits a command, which requests actuation of the air conditioning system, to the climate control ECU 18 of the in-vehicle LAN 10 through a cellular phone or the like to remote control the air conditioning system. Another exemplary access is an access from the user who obtains music data through the telephone line and plays it via the audio ECU 20 of the vehicle. A further exemplary access is an access from the user who downloads a program, which is operable in the corresponding ECU 11–22 in the in-vehicle LAN 10, from the external center through the telephone line. The program is then installed in the corresponding ECU 11–22 to write or update the program.

Each radio communication device 41, 42, 43, 44 of the communication unit 40 has been described. In the in-vehicle communication system 1, it is conceivable that the communication unit 40 receives communication data having no indication of a receiving end (i.e., a requested device, to which the external device tries to access) from the external device. Thus, in order to deal with such a case, for example, it is advantageous to construct each radio communication device 41–44 in such a manner that each radio communication device 41–44 adds information of the receiving end to the communication data having no indication of the receiving end and then transmits the communication data provided with the information of the receiving end to the gateway ECU 50. For example, when the television signal is received, the audio ECU 20 can be specified as the receiving end of the television signal.

Furthermore, the external device interface 49 includes a connector. The connector connects the external devices, such as a service tool 5 for diagnosing the vehicle or another service tool 5 for updating the program in the ECU, to the in-vehicle LAN 10. When the service tool 5 is connected to the external device interface 49, the service tool 5 is connected to the gateway ECU 50.

The gateway ECU 50 is connected to both the communication unit 40 and the in-vehicle LAN 10 and relays data communications between each ECU 11–22 of the in-vehicle LAN 10 and the external device 3.

For example, the gateway ECU 50 has a rooting function, so that the gateway ECU 50 relays an access from one ECU in one network of the in-vehicle LAN 10 to another ECU in another network of the in-vehicle LAN 10. Specifically, for example, when an access request for accessing one ECU in the body system network 33 to one ECU in the control system network 31 is received, the gateway ECU 50 transmits communication data from the one ECU in the body system network 33 to the one ECU in the control system network 31.

Figure 2:
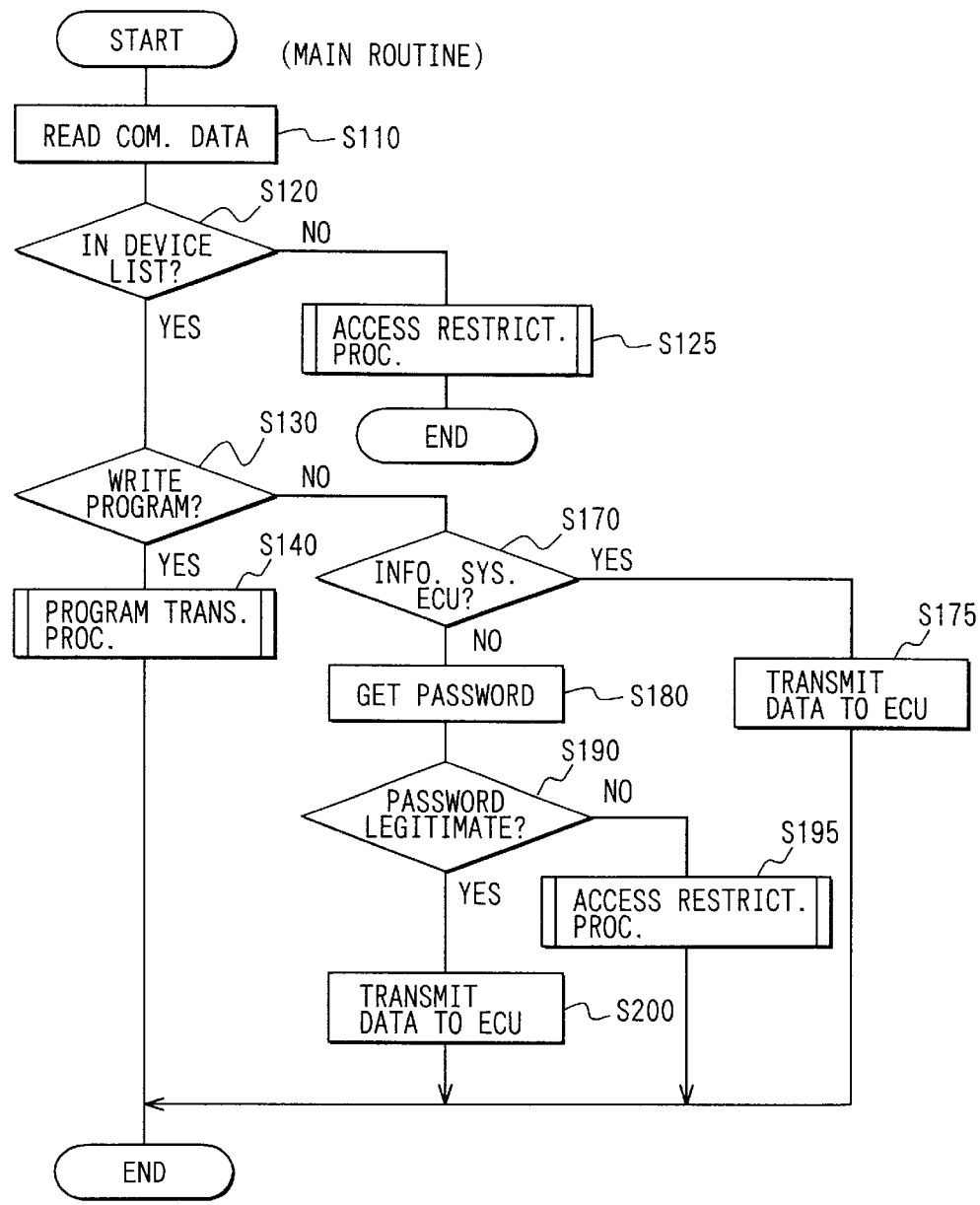
FIG. 2 is a flow chart showing a main routine executed by a gateway ECU of the first embodiment.

When the gateway ECU 50 obtains the communication data received through the communication unit 40, the gateway ECU 50 performs a main routine shown in FIG. 2 in its own MPU.

Figure 3:
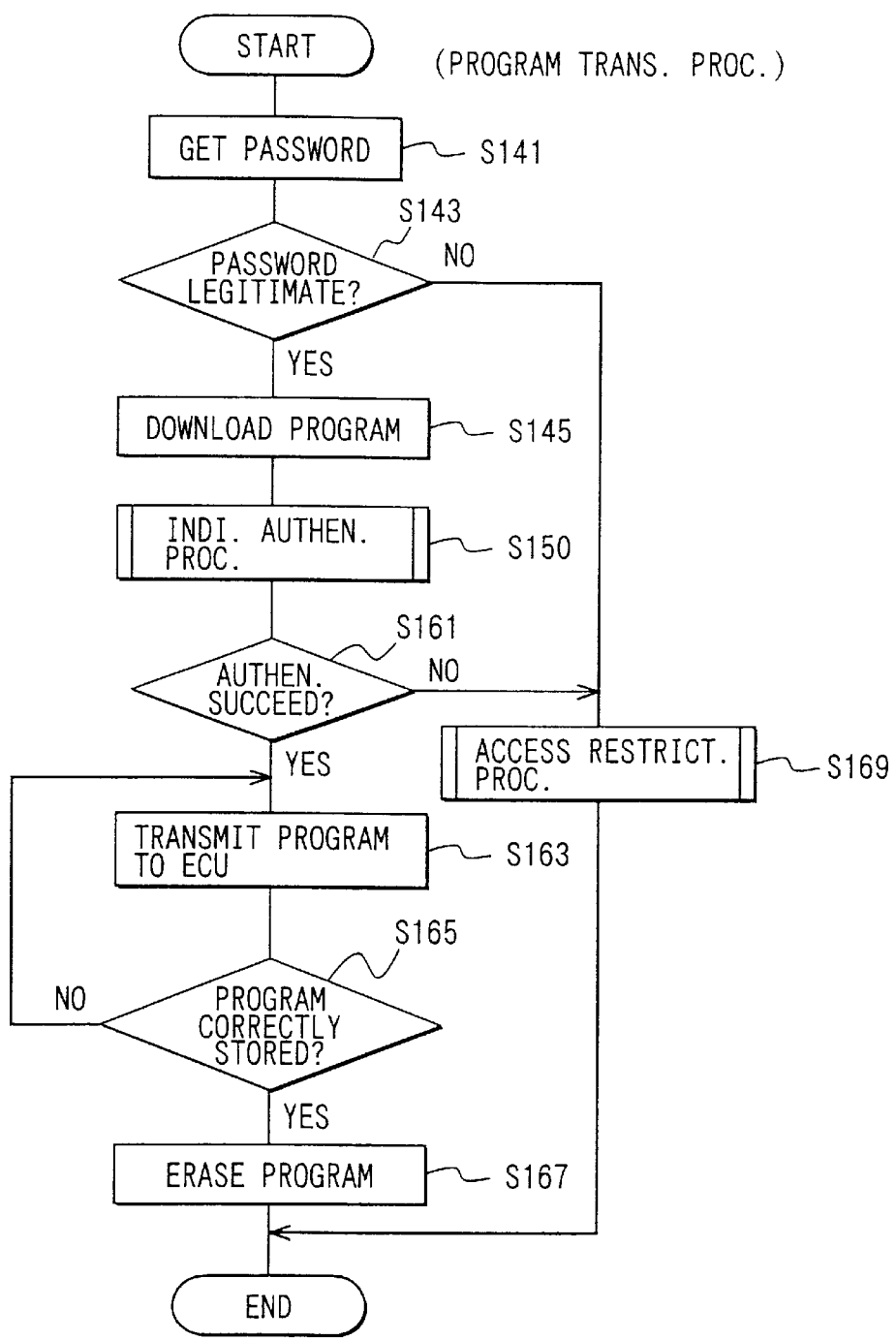
FIG. 3 is a flow chart showing a program transferring process executed by the gateway ECU of the first embodiment.
Figure 5:
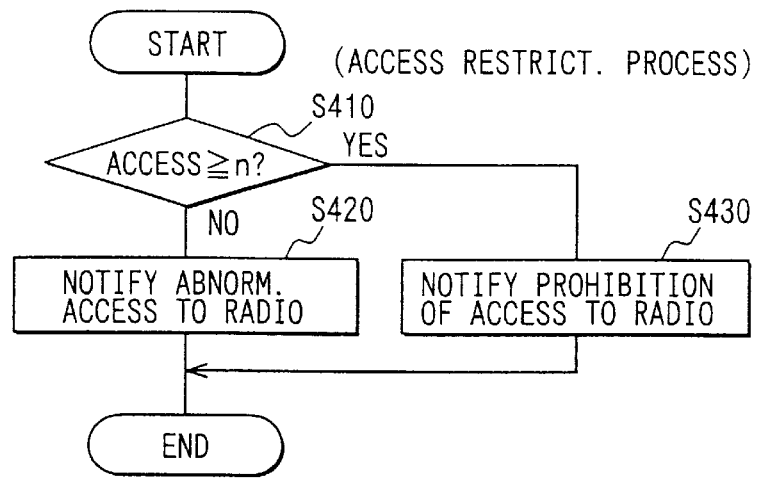
FIG. 5 is a flow chart showing an access restricting process executed by the gateway ECU of the first embodiment.

FIG. 2 is a flow chart showing the main routine performed in the gateway ECU 50. FIG. 3 is a flow chart showing a program transferring process, which is called by the main routine. FIG. 4A is a flow chart showing an individual authenticating process, which is called by the program transferring process. FIG. 5 is a flow chart showing an access restricting process.

In the gateway ECU 50, first, at step S110, a receiving end of communication data (i.e., the requested device) is read from the communication data. Then, at step S120, it is determined whether the receiving end is listed in an in-vehicle device list stored in a storage medium (the storage medium of the present embodiment is a memory) of the gateway ECU 50. The in-vehicle device list is a list of the ECUs 11–22 connected to the in-vehicle LAN 10.

When it is determined that the receiving end of the communication data is not listed in the in-vehicle device list, the gateway ECU 50 performs the access restricting process at step S125 (described in greater detail below) and terminates the main routine.

On the other hand, when it is determined that the receiving end of the communication data is listed in the in-vehicle device list, the gateway ECU 50 determines whether the communication data includes information about a request for writing a program or a matching constant (parameter) in the corresponding ECU of the in-vehicle LAN 10 that is specified as the receiving end at step S130. The program is operable in the corresponding ECU of the in-vehicle LAN 10. The matching constant is applied to properly operate the corresponding control system of the vehicle. In this embodiment, the request for writing the matching constant can be, for example, a request for rewriting an engine ignition timing map.

When it is determined that the communication data includes the information about the request for writing the program or parameter, control moves to step S140 where the program transferring process (FIG. 3) is performed. In the following description, although only the request for writing the program is discussed for the sake of simplification, the request for writing the matching constant will be handled in a manner similar to that of the request for writing the program.

In the program transferring process, at step S141, the gateway ECU 50 requests the external device 3, which has transmitted the request for writing the program through the communication unit 40, to transmit a password, which acts as a first authentication information, to the gateway ECU 50. Thus, the gateway ECU 50 obtains the password from the external device 3.

Then, at step S143, the gateway ECU 50 determines whether the transmitted password matches with a pre-registered password, which has been registered in the gateway ECU 50. For example, the password can be registered at the time of product shipment by a manufacturer. This can be done by registering or storing a gateway ECU 50 specific password in the gateway ECU 50.

When it is determined that the transmitted password is not legitimate (i.e., the transmitted password does not match with the pre-registered password) at step S143, the gateway ECU 50 shifts the process to step S169 where the access restricting process (FIG. 5) is performed, and thereafter the program transferring process is terminated. On the other hand, when it is determined that the transmitted password matches with the pre-registered password at step S143, the gateway ECU 50 shifts the process to step S145 where the program is downloaded from the external device 3 through the communication unit 40 and is temporarily stored in the memory of the gateway ECU 50.

Then, the gateway ECU 50 performs the individual authenticating process (FIG. 4) at step S150.

When control moves to the individual authenticating process, the gateway ECU 50 requests the corresponding ECU, to which the external device 3 intends to write the program, (hereinafter, this ECU will be referred to as a requested ECU) of the in-vehicle LAN 10 to download the program at step S151.

When the gateway ECU 50 requests the requested ECU to download the program, the requested ECU performs a program downloading process, which is shown in a flow chart of FIG. 4B. Details of the individual authenticating process of FIG. 4A, which is performed by the gateway ECU 50, and details of the program downloading process of FIG. 4B will be described in parallel.

Upon receiving the request for downloading the program, the requested ECU requests the external device 3 to transmit second authentication information at step S310. The second authentication information is different from the first authentication information and is used to determine whether the external device 3, from which the request for writing the program is received, has been authorized to write the program in the requested ECU.

For example, if a common key system (e.g., a DES system) is chosen as an authentication system, the requested ECU performs the following operation at step S310. That is, the requested ECU generates and temporarily stores a random number r in its own memory. Then, the requested ECU transmits the random number r to the external device 3 along with the request for transmitting the second authentication information. At the same time, the requested ECU requests the external device 3 to encrypt the random number r using a common key K and to return it as the second authentication information to the requested ECU.

When the request for transmitting the authentication information is issued from the requested ECU to the external device 3, the gateway ECU 50 first receives the request for transmitting the authentication information from the requested ECU and forwards it to the external device 3 through the communication unit 40 (step S153). Furthermore, when the gateway ECU 50 receives the authentication information from the external device 3 as a response to the request for transmitting the authentication information, the gateway ECU 50 forwards the authentication information to the requested ECU at step S155.

When the requested ECU receives the authentication information from the external device 3 through the gateway ECU 50 (step S320), the requested ECU verifies the authentication information by comparing it with the corresponding authentication information stored in its own memory (step S330). Then, based on the result of the verification, the requested ECU determines whether the authentication of the external device 3 has succeeded based on the result of the verification (step S340). When it is determined that the authentication has succeeded (step S340: YES), the requested ECU issues an authentication success notification for notifying the success of the authentication to the gateway ECU 50 (step S350). On the other hand, when it is determined that the authentication has not succeeded (step S340: NO), the requested ECU issues an authentication failure notification for notifying the failure of the authentication to the gateway ECU 50 (step S355).

The example of the authentication with the common key system will be described in greater detail. The requested ECU decrypts the authentication information, which is received from the external device 3, with the common key K. Then, the requested ECU determines whether the decrypted authentication information matches with the random number r, which is generated at step S310. When it is determined that the decrypted authentication information matches with the random number r, the requested ECU determines that the external device 3 has been authorized to write the program in the requested ECU (step S340: YES). Then, the requested ECU issues the authentication success notification to the gateway ECU 50.

When the gateway ECU 50 receives the result of the authentication (the notification indicating the success or failure of the authentication) from the requested ECU at step S157, the gateway ECU 50 terminates the individual authenticating process and determines whether the authentication at the requested ECU has succeeded at step S161 in the program transferring process (FIG. 3).

That is, when the gateway ECU 50 receives the authentication failure notification from the requested ECU, "NO" is returned at step S161, so that control moves to step S169. On the other hand, when the gateway ECU 50 receives the authentication success notification from the requested ECU, "YES" is returned at step S161, so that control moves to step S163.

Then, at step S163, the gateway ECU 50 transmits the temporarily stored corresponding program to the requested ECU. Then, the requested ECU receives the program transferred from the gateway ECU 50 and stores the program in its memory in an executable manner (step S360).

When the requested ECU stores the program, the gateway ECU 50 determines whether the requested ECU correctly stores the program at step S165. For example, the gateway ECU 50 determines whether the requested ECU has correctly stored the program by checking whether the program, which is transferred from the gateway ECU 50, is the same as the program, which is stored in the memory of the requested ECU.

Then, when it is determined that the program has correctly stored in the memory of the requested ECU, the gateway ECU 50 discards or erases the program, which is transmitted to the requested ECU at step S163, from its own memory (step S167). Then, the program transferring process is terminated. On the other hand, when it is determined that the program has not correctly stored in the memory of the requested ECU (step S165: NO), the gateway ECU 50 retrieves the corresponding program stored in its own memory and transmits it to the requested ECU (step S163). When the writing of the program in the requested ECU cannot succeed after several tries, the writing of the program can be terminated, and the program transferring process can be terminated.

Next, at step S130 (FIG. 2), the situation where the gateway ECU 50 determines that the current communication data is not the request for writing the program or matching constant (S130: NO) will be described.

As shown in FIG. 2, when "NO" is returned at step S130, the gateway ECU 50 determines whether the receiving end (requested ECU) that receives the communication data is one of the information system ECUs 19–22 connected to the information system network 32 at step S170.

When it is determined that the requested ECU is one of the information system ECUs 19–22 (step S170: YES), the gateway ECU 50 transmits the communication data to the requested ECU, i.e., the one of the information system ECUs 19–22 at step S175.

On the other hand, when it is determined that the requested ECU is not one of the information system ECUs 19–22 (step S170: NO), the gateway ECU 50 requests the external device 3, from which the data is transmitted, to transmit the password, which is addressed to the corresponding ECU, and receives the password as the authentication information from the external device 3 through the communication unit 40 (step S180).

Then, the gateway ECU 50 determines whether the password is legitimate by determining whether the password matches with a password, which has been previously registered in the gateway ECU 50 at step S190. The gateway ECU 50 can use the same password, which is used at step S143 in the program transferring process or can use any other password. In the later case, the gateway ECU 50 needs to store both the password used at step S143 and the password used at step S190.

When it is determined that the password is legitimate (step S190: YES), the gateway ECU 50 transmits the data to the requested ECU (step S200). On the other hand, when it is determined that the password is not legitimate (step S190: NO), an access restricting process is performed at step S195, and the current process is terminated.

In the access restricting process at step S195, the gateway ECU 50 is operated in a manner shown in FIG. 5.

That is, at step S410, the gateway ECU 50 determines whether equal to or more than a predetermined number n (e.g., this number can be three) of accesses have made within a predetermined time from the same external device 3 to the gateway ECU 50. When it is determined that equal to or more than the predetermined number n of accesses have not made (step S410: NO), at step S420, the gateway ECU 50 notifies the corresponding radio communication device 41–44 (corresponding operation of the corresponding radio communication device 41–44 will be described later) in the communication unit 40 that the abnormal accesses, which have failed the authentication, have made from the external device 3. Then, the current process is terminated.

On the other hand, when it is determined that equal to or more than the predetermined number n of accesses have made (step S410: YES), the gateway ECU 50 notifies the corresponding radio communication device 41–44 to prohibit the further access from the unauthorized external device 3 (step S430). Thus, further communication data from the same transmitting end external device 3 is not transmitted from the corresponding radio communication device 41–44 to the gateway ECU 50. Then, the current process is terminated.

Figure 6:
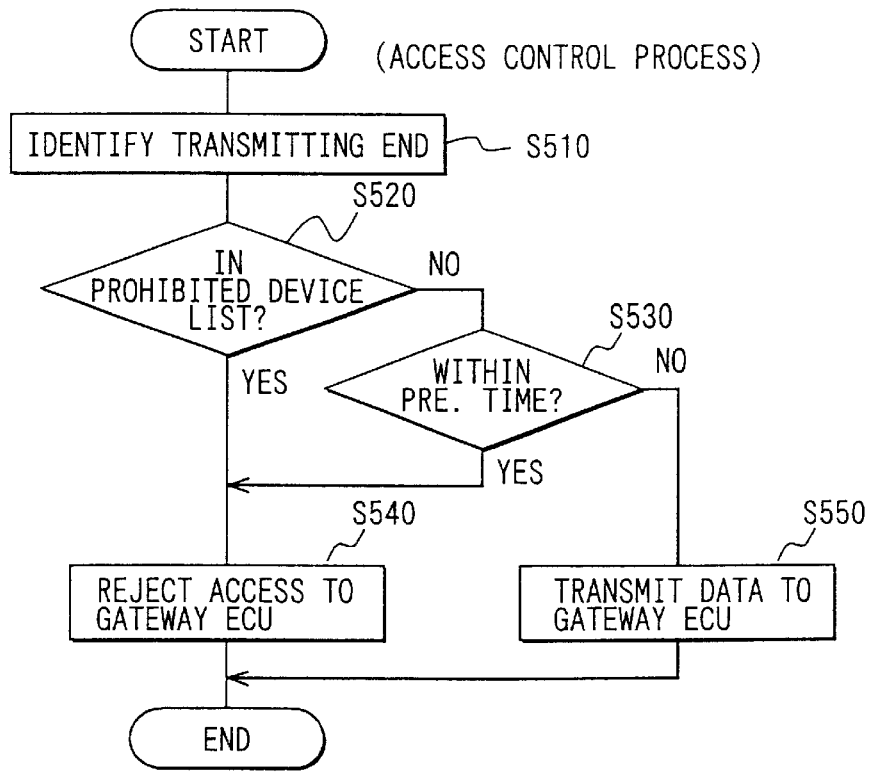
FIG. 6 is a flow chart showing an access control process executed by each radio communication device of the first embodiment.

Each corresponding radio communication device 41–44, which receives the notification in the access restricting process, performs an access control process shown in FIG. 6 to control the access from the external device 3.

When the corresponding radio communication device 41–44 receives the communication data as a result of demodulation from a demodulation circuit, the corresponding radio communication device 41–44 obtains the information about the transmitting end external device 3, which is contained in the communication data, and identifies the transmitting end external device 3 (step S510) Then, the corresponding radio communication device 41–44 determines whether the transmitting end is listed in an access prohibited device list at step S520. The corresponding radio communication device 41–44 renews or updates the access prohibited device list each time that the corresponding radio communication device 41–44 receives the notification, which prohibits the further access from the unauthorized external device 3, from the gateway ECU 50. Each radio communication device 41–44 stores the access prohibited device list in its own memory.

When it is determined that the transmitting end of the communication data is in the access prohibited device list at step S520, the corresponding radio communication device 41–44 rejects the further access from the transmitting end external device 3 to the gateway ECU 50 at step S540. That is, the corresponding radio communication device 41–44 discards or erases the communication data received from the transmitting end without transmitting the communication data to the gateway ECU 50.

On the other hand, when it is determined that the transmitting end external device 3, which has transmitted the communication data, is not in the access prohibited device list at step S520, the corresponding radio communication device 41–44 determines whether a predetermined time period has elapsed since the corresponding radio communication device 41–44 has received the abnormal access from the transmitting end external device 3 at step S530. Here, it is preferred that the predetermined time period is sufficiently shorter than the time period for determining whether equal to or more than the predetermined number n of accesses have made from the same external device 3 to the gateway ECU 50 at step S410.

When it is determined that the predetermined time period has not elapsed since the abnormal access at step S530, control moves to step S540. At step S540, the corresponding radio communication device 41–44 rejects the access from the transmitting end external device 3 to the gateway ECU 50. On the other hand, when it is determined that the predetermined time period has elapsed since the abnormal access or when it is determined that an abnormal access notification for notifying the abnormal accesses has not received, control moves to step S550 where the corresponding communication data is transmitted to the gateway ECU 50.

In the in-vehicle communication system 1 of the above embodiment, the gateway ECU 50 determines whether the external device 3 has been authorized to access each corresponding ECU 11–22 of the in-vehicle LAN 10 (i.e., whether the external device 3 has been authorized to establish the data communication with each corresponding ECU 11–22) with use of the password obtained from the external device 3 when the gateway ECU 50 relays the communication between the communication unit 40 and the in-vehicle LAN 10. Thus, it is possible to prevent the unauthorized access to each ECU 11–22 in the in-vehicle LAN 10 from the external device 3. Furthermore, with the above arrangement, the unauthorized external access can be more effectively restrained in comparison to the case where the external device 3 is authenticated only by individual ECUs, and such a system can be implemented at less cost. Also, the connecting lines (or wiring) in the in-vehicle communication system can be reduced.

In the in-vehicle communication system 1 of the above embodiment, when the communication data does not relate to the write request for writing the program or matching constant, and the receiving end (requested device), which receives the communication data, is one of the information system ECU (i.e., one of the ECUs 19–22 connected to the information network), which is provided to notify the external information to the vehicle passenger, the authenticating process for authenticating the external device 3 is not performed.

This is due to the following reason. That is, as long as the communication data is addressed to the information system ECUs 19–22, the communication data does not have an influence on the driving safety of the vehicle even if the communication data is maliciously prepared to cause an undesirable result. Furthermore, due to the fact that the information system ECUs are frequently accessed from outside the vehicle, a heavy load will be imposed on the gateway ECU 50 if the authenticating process for authenticating the external device 3 is performed for the information system ECUs 19–22. However, it should be understood that individual authentication can be performed by each individual ECU, as required.

On the other hand, if the receiving ends are the ECUs (i.e., the ECUs 11–18 connected to the control system network 31 or the body system network 33) other than the information system ECUs, the authentication of the external device 3, for example, with the password is performed at least once. This is due to the following reason. That is, each ECU connected to the control system network 31 or the body system network 33 is relevant to the vehicle control, so that the unauthorized access to such an ECU needs to be prevented to maintain the driving safety of the vehicle.

Furthermore, particularly in the case of the in-vehicle communication system 1 of the present embodiment, if the communication data is relevant to the request for writing the program or matching constant, the access from the external device 3 is more restricted by performing the second authentication in addition to the first authentication with use of the password or the like regardless of the type of receiving end ECU. Thus, in the in-vehicle communication system 1 of the present embodiment, the unauthorized rewrite or modification of the program, which is executed in the corresponding ECU, or the matching constant, which is relevant to the vehicle control, can be prevented.

Also, in the in-vehicle communication system 1, the accesses from the external device 3, which tends to fail the authentication, is prohibited when the number of the accesses reaches the n, and the communication unit 40 prevents the communication data of such an external device 3 from reaching the gateway ECU 50. Thus, the unauthorized accesses will not cause an increase in the processing load of the gateway ECU 50.

A relationship between the in-vehicle communication system 1 of the above embodiment and the in-vehicle communication system of the present invention, which is disclosed in the appended claims, is as follows.

First, the vehicular relay device of the present invention corresponds to the gateway ECU 50 of the above embodiment. Information system electronic devices of the present invention correspond to the information system ECUs 19–22. The control system electronic devices of the present invention correspond to the ECUs 11–18 connected to the control system network 31 or the body system network 33. The access request from the external device corresponds to the operation of the external device 3, which transmits the communication data to the communication unit 40.

The first identifying means of the present invention corresponds to the operation of the gateway ECU 50 at step S170, which determines whether the requested in-vehicle ECU is one of the information system ECUs acting as the information system electronic devices based on the requested in-vehicle ECU determined at step S110. The first authenticating means of the present invention corresponds to the operation of the gateway ECU 50, which obtains the password acting as the first authentication information at step S180 and determines whether the password is legitimate at step S190. The first delivering means of the present invention corresponds to the operation of the gateway ECU 50, which is performed at step S175 when the gateway ECU 50 returns "YES" at step S170 and also corresponds to the operation of the gateway ECU 50, which is performed at step S200 when the gateway ECU 50 returns "YES" at step S190.

The second identifying means of the present invention corresponds to the operation of the gateway ECU 50, which is performed at step S130. The second authenticating means of the present invention corresponds to the operation of the gateway ECU 50, which shifts the process to step S170 when the gateway ECU 50 determines that the access request is not the write request for writing the program or the like in the requested in-vehicle ECU. The second authenticating means of the present invention also corresponds to the operation of the gateway ECU 50, which is performed at steps S141–S161 when gateway ECU 50 determines that the access request is the write request for writing the program or the like in the requested in-vehicle ECU at step S140. The second delivering means of the present invention corresponds to the operation of the gateway ECU 50, which is performed at step S163 based on a result of the determination at step S161 to transmit the communication data (e.g., the program) to the requested in-vehicle ECU.

The vehicular relay device and the in-vehicle communication system of the present invention are not limited to those described in the above embodiment and can take various other forms.

For example, in the above embodiment, the authentication of the external device 3 is performed with use of the password. However, the external device 3 can be authenticated through any other appropriate authentication system or method. When the external device 3 is authenticated through the highly reliable authenticating method, such as the common key system, the time required for the authentication is lengthened. However, the unauthorized access to the ECUs in the in-vehicle LAN 10 can be more reliably restrained.

Furthermore, when the write request for writing the program or the like in the requested in-vehicle ECU is received, the external device 3 is authenticated twice using the different authentication methods. However, in order to further enhance the security in the writing of the program or the like, the external device 3 can be authenticated three times or more with the highly reliable authenticating method. Alternatively, the external device 3 can be authenticated only once with the highly reliable authenticating method.

(Second Embodiment)

A second embodiment of the present invention will be described with reference to the accompanying drawings.

Figure 7:
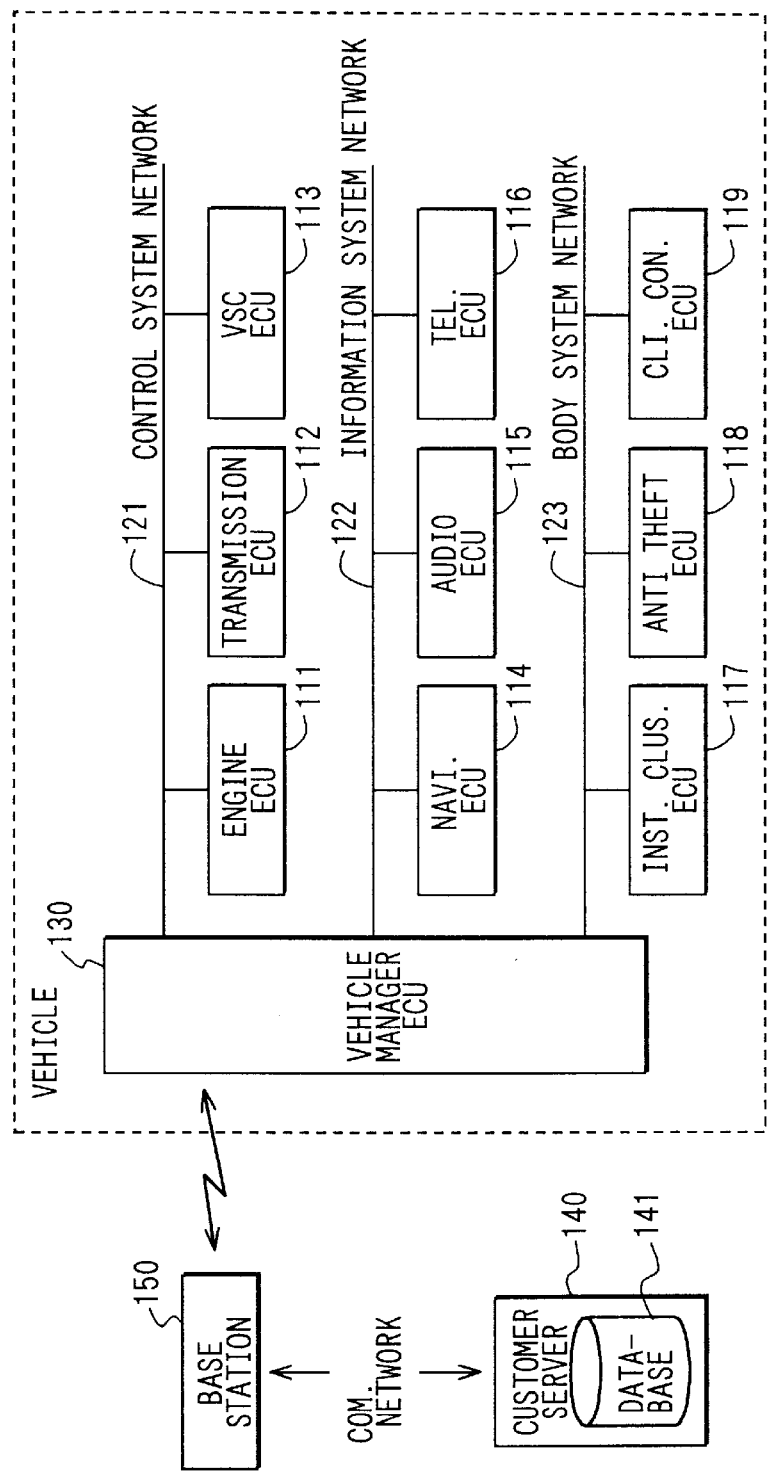
FIG. 7 is a schematic view illustrating a structure of a failure diagnostic system according to a second embodiment of the present invention.

FIG. 7 is a schematic view showing a structure of a failure diagnostic system according to the present embodiment.

The failure diagnostic system of the present embodiment includes in-vehicle computer systems, which are located in a vehicle, and a customer server (external device) 140, which is located outside of the vehicle. The customer server 140 is used as a server device of the present invention.

The computer systems installed in the vehicle include an engine ECU 111, a transmission ECU 112, a VSC ECU 113, a navigation ECU 114, an audio ECU 115, a telephone ECU 116, an instrument cluster ECU 117, an antitheft ECU 118, a climate control ECU 119 and a vehicle manager ECU 130. The engine ECU 111, the transmission ECU 112, the VSC ECU 113, the navigation ECU 114, the audio ECU 115, the telephone ECU 116, the instrument cluster ECU 117, the antitheft ECU 118 and the climate control ECU 119 act as electronic control devices (or electronic devices) of the present invention, and the vehicle manager ECU 130 acts as a vehicle management device of the present invention.

The vehicle manager ECU 130 is connected to a control system network 121, an information system network 122 and a body system network 123, which are used as in-vehicle networks. The control system network 121 includes the engine ECU 111, the transmission ECU 112 and the VSC ECU 113. The information system network 122 includes the navigation ECU 114, the audio ECU 115 and the telephone ECU 116. The body system network 123 includes the instrument cluster ECU 117, the antitheft ECU 118 and the climate control ECU 119.

The engine ECU 111 mainly performs a control operation of a vehicle engine. Specifically, the engine ECU 111 controls injectors and a throttle motor based on sensor signals transmitted from relevant sensors, such as an accelerator sensor, an air-fuel ratio sensor and an air flow sensor. The transmission ECU has functions relevant to shifting of gears of an automatic transmission. The VSC ECU 113 has functions relevant to adjustment of a brake oil pressure. The navigation ECU 114 has functions relevant to guidance of the vehicle along a selected route to its destination. The audio ECU 115 has functions relevant to play of a compact disc (CD) or the like. The telephone ECU 116 has functions relevant to transmission and reception of calls in a hand free cellular phone. The instrument cluster ECU 117 has functions relevant to indication of information on various vehicle physical values. The antitheft ECU 118 has functions relevant to antitheft operations, such as notification of an emergency situation based on abnormal vibrations generated in the parked vehicle. The climate control ECU 119 has functions relevant to control of air temperature and air flow for adjusting room temperature to a selected temperature.

As described above, each ECU 111–119 controls its subject (subject to be controlled by the ECU) and can cooperate with the other ECU 111–119 whenever required. For example, a vehicle speed, which is the display information of the instrument cluster ECU 117, is transmitted from the engine ECU 111 to the instrument cluster ECU 117 through the vehicle manager ECU 130. In this sense, the vehicle manager ECU 130 has a function of a known gateway ECU. Furthermore, each ECU 111–119 executes a failure detection program for detecting a failure of each corresponding apparatus during the control operation of its assigned subject. Result of the failure detection obtained through the execution of the failure detection program is transmitted to the vehicle manager ECU 130. In this embodiment, when each corresponding ECUs 111–119 receives a request for transmitting an internal variable used in a corresponding control operation from the vehicle manager ECU 130, the corresponding ECU 111–119 executes an associated process program, which is associated with the request and is preinstalled in the ECU 111–119. Then, the corresponding ECU 111–119 outputs the requested information to the vehicle manager ECU 130. The ECU operation for executing the associated process program and for diagnosing the result obtained through the execution of the associated process program will be described.

The customer server 140 is located outside of the vehicle and establishes wireless data communication with the vehicle manager ECU 130 through a base station 150 when the customer server 140 is connected to an information communication network. The customer server 140 is also constructed as a computer system and includes a database 141, which acts as a storage means of the present invention.

Figure 8:
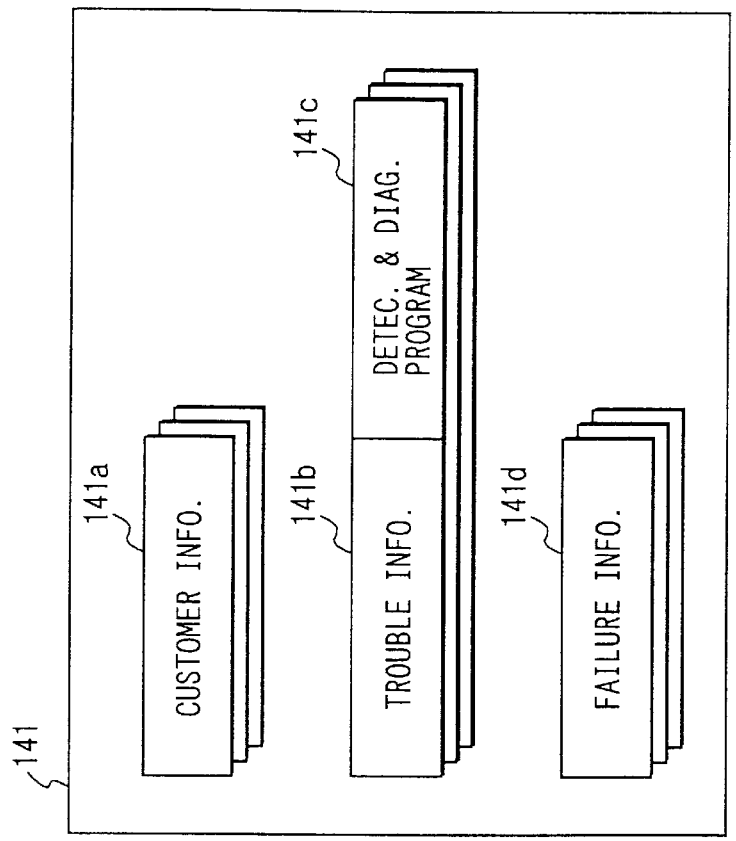
FIG. 8 is a schematic view illustrating information in a database of a customer server according to the second embodiment.

With reference to FIG. 8, the database 141 stores customer information 141a, trouble information 141b, various detection and diagnostic programs 141c and failure information 141d. The customer information 141a is prepared for each customer who subscribes a service of the failure diagnostic system of the present embodiment. The trouble information 141b is prepared by typifying troubles of the vehicles. The detection and diagnostic program 141c is executed by the vehicle manager ECU 130. The failure information 141d is transmitted from the vehicle manager ECU 130 to the customer server 140 based on the result obtained by executing the corresponding detection and diagnostic program 141c in the vehicle manager ECU 130 and is stored in the database 141. Each detection and diagnostic program 141c is customized to correspond with the corresponding trouble information 141b. In FIG. 8, each trouble information 141b is linked with the corresponding detection and diagnostic program 141c.

The customer information 141a includes identification information, failure history information, vehicle information and contact information. The identification information is used to identify a user who has accessed the customer server 140. The failure history information includes information relevant to previously encountered failures of each corresponding vehicle. The vehicle information includes a model and a grade of each corresponding vehicle. The contact information is used to make contact in a case of the failure of the vehicle. The identification information includes, for example, a user ID and a password. The contact information includes, for example, a contact telephone number and/or a contact fax number.

The trouble information 141b is prepared by typifying trouble symptoms of the vehicles. The trouble information 141b is used as a key for searching the corresponding detection and diagnostic program 141c based on the current trouble information contained in inquiry information transmitted from the vehicle manager ECU 130.

The detection and diagnostic program 141c is downloaded and executed by the vehicle manager ECU 130. When the detection and diagnostic program 141c is executed, it causes execution of the associated process, which is associated with the detection and diagnostic program 141c, in each corresponding one of the ECUs 111–119, and a corresponding failed part is identified by the detection and diagnostic program 141c based on information transmitted from each corresponding one of the ECUs 111–119 upon the execution of the associated process therein.

The failure information 141d is a type of information that is transmitted only when the failed part is identified by the vehicle manager ECU 130. The failure information 141d is valuable information for constructing the detection and diagnostic program 141c and is thus stored in the database 141 of the customer server 140 for future use.

Operation of the failure diagnostic system of the present embodiment will be described.

Operation of the vehicle manager ECU 130 will be first described, and the customer server 140 and operation of each ECU 111–119 will be described next.

Figure 9:
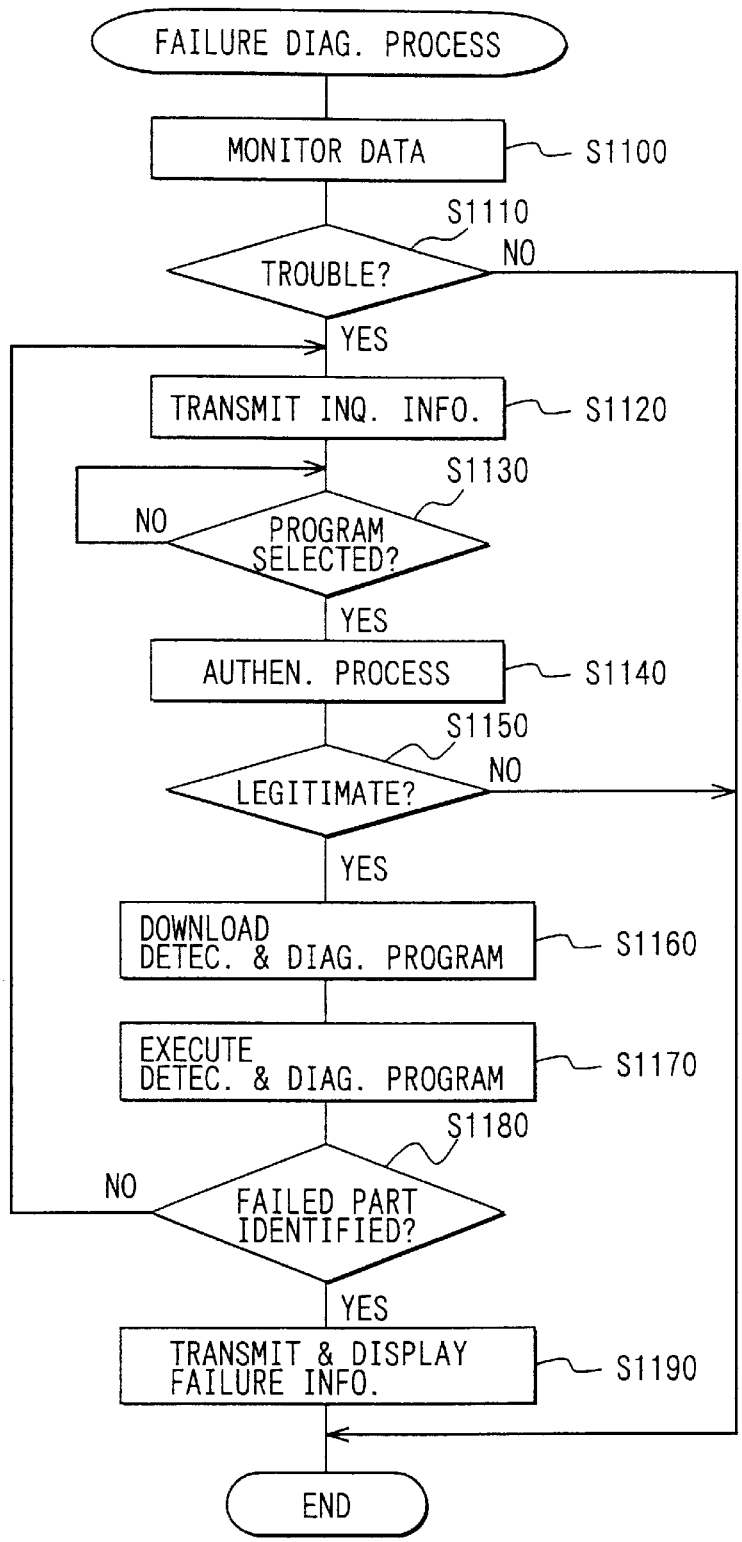
FIG. 9 is a flow chart showing a failure diagnostic process according to the second embodiment.

FIG. 9 depicts a flow chart showing the failure diagnostic process executed in the vehicle manager ECU 130. This process is repeated at predetermined time intervals.

First, in step S1100, data of each ECU 111–119 in the vehicle networks 121–123 is monitored. The monitored data includes result data of the failure detection, which is obtained through the execution of the failure detection program in each ECU 111–119. The monitored data also includes data, which is communicated between the ECUs 111–119 through the vehicle manager ECU 130. That is, the vehicle manager ECU 130 detects not only the current trouble in the corresponding apparatus through each ECU 111–119 but also the current trouble in the collaborative operation of the ECUs 111–119 through the monitoring of the data. For example, it could happen that although data outputted from the navigation ECU 114 indicates that the vehicle currently travels on an uphill, data outputted from the engine ECU 111 shows substantially no change in engine load. Occurrence of such a condition is classified as a trouble pattern and is thus monitored by the vehicle manager ECU 130.

Next, at step S1110, it is determined whether the trouble of the vehicle currently exists based on a result of the monitoring of the data. If it is determined that the trouble of the vehicle currently exists (S1110: YES), control moves to step S1120. On the other hand, if it is determined that the trouble of the vehicle does not currently exist (S1110: NO), the failure diagnostic process is terminated without performing the following steps.

At step S1120, a data communication link is established with the customer server 140, and inquiry information is transmitted to the customer server 140 from the vehicle manager ECU 130. Here, the data communication link is established through the following predetermined process. That is, the vehicle manager ECU 130 calls the customer server 140 and then transmits, for example, the user ID and the password to the customer server 140. Next, the customer server 140 determines whether the user is the subscriber of the service based on the identification information contained in the customer information 141a. Once the data communication link is established through the above process, inquiry information is transmitted from the vehicle manager ECU 130 to the customer server 140. The inquiry information includes the current trouble information, which indicates the current trouble determined to exist at step S1110.

In the customer server 140, the corresponding detection/diagnosis program 141c is selected through comparison of the current trouble information contained in the inquiry information with the trouble information 141b contained in the database 141 and also based on the failure history information and the vehicle information contained in the customer information 141a.

Thus, at the next step S1130, it is determined whether the detection and diagnostic program has been selected. This is determined based on a selection completion notification, which is transmitted from the customer server 140 and notifies completion of the selection of the detection/diagnosis program. If it is determined that the detection and diagnostic program has been selected (S1130: YES), control moves to step S1140. On the other hand, if it is determined that the detection and diagnostic program has not been selected (S1130: NO), the above operation is repeated.

At step S1140, an authentication process is executed. The authentication process is provided to ensure safety of the vehicle by preventing downloading of an illegitimate program from the customer server 140. Specifically, it is conceivable to use a mathematic function, which has bee used to rewrite data in the ECU with a diagnostic tool. For example, one device transmits a functional value f(r), such as a random number r, to the other device, and then the other device transmits a functional value F(f(r)), which is obtained based on the functional value f(r), to the one device. Next, when the one device determines that the functional value F(f(r)) is equal to r, i.e., the function F is equal to $f^{-1}$, the one device determines that the other device is the legitimate device.

Upon completion of the above authentication process (S1140), if it is determined that the customer server 140 is legitimate (S1150: YES), control moves to step S1160. On the other hand, if it is determined that the customer server 140 is illegitimate (S1150: NO), the failure diagnostic process is terminated without performing the following steps.

At step S1160, the corresponding detection and diagnostic program 141c is downloaded from the customer server 140. Here, the vehicle manager ECU 130 requests download of the detection and diagnostic program 141c to the customer server 140 and then downloads the detection and diagnostic program 141c from the customer server 140.

At the following step S1170, the downloaded detection and diagnostic program 141c is executed in the vehicle manager ECU 130. Thus, only each corresponding ECU 111–119 executes the associated process. Upon the execution of the associated process, the information, such as the internal variable of the corresponding control operation, is transmitted to the vehicle manager ECU 130 from each corresponding ECU 111–119. Then, the detection and diagnostic program 141c specifies the failed part based on the information transmitted from the customer server 140.

At the next step S1180, it is determined whether the failed part has been identified. If it is determined that the failed part has been identified (S1180: YES), control moves to step S1190. On the other hand, if the failed part has not been identified (S1180: NO), control returns to step S1120. That is, if "NO" is returned, a new inquiry is transmitted from the vehicle manager ECU 130 to the customer server 140 (S1120). Then, a different detection and diagnostic program is selected (S1130: YES) in the customer server 140 and is downloaded and executed (S1160, S1170) in the vehicle manager ECU 130.

At step S1190, the failure information relevant to the failed part is transmitted to the customer server 140, and information indicative of the failure is visually displayed or is audibly indicated in the vehicle. Then, the failure diagnostic process is terminated. The display of the information indicative of the failure can be achieved, for example, by outputting the information from the vehicle manager ECU 130 to the instrument cluster ECU 117 to lit a warning lamp. Alternatively, the information indicative of the failure can be outputted to the navigation ECU 114 to display the information on a navigation display used to guide the vehicle along the route to the destination. In the later case, a specific message, such as "please replace the xxx component" (here, the xxx component represents any failed part) or a non-specific message, such as "please call your local service shop for repair service" can be displayed on the navigation display. It is convenient to allow modifications of these messages based on a customer's need.

Figure 10:
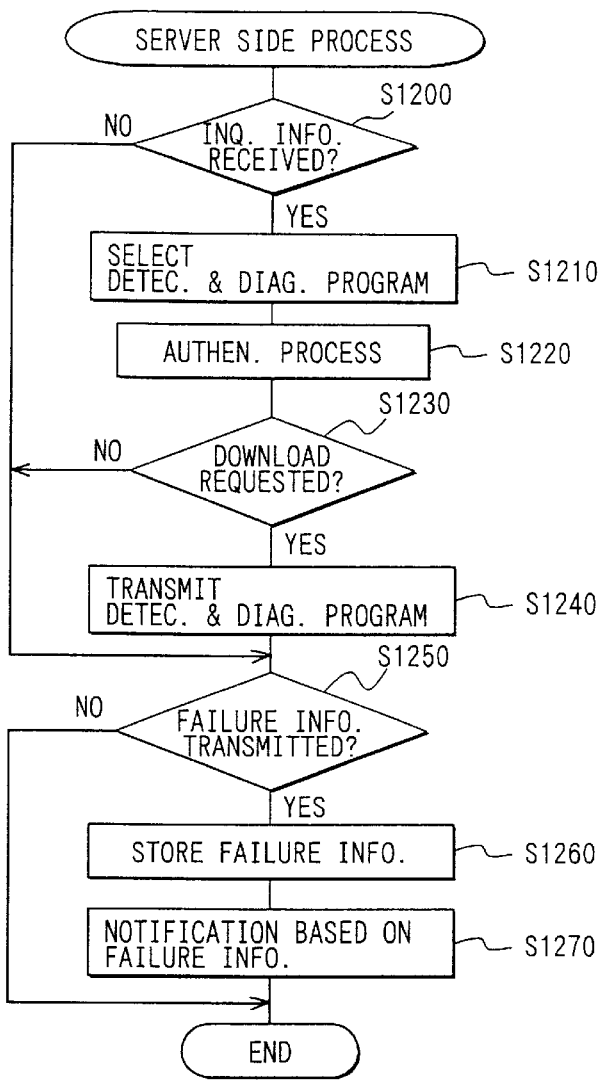
FIG. 10 is a flow chart showing a server side process according to the second embodiment.

A process, which is executed in the customer server 140 in response to the execution of the failure diagnostic process in the vehicle manager ECU 130, is referred to as a server side process shown in the flow chart of FIG. 10. The server side process is executed at predetermined time intervals when the data communication link is established with the vehicle manager ECU 130 through, for example, the above predetermined steps.

First, at step S1200, it is determined whether the inquiry information has been transmitted from the vehicle manager ECU 130. This process corresponds to step S1120 of FIG. 9. If the inquiry information has been transmitted from the vehicle manager ECU 130 (step S1200: YES), control moves to step S1210. On the other hand, if the inquiry information has not been transmitted from the vehicle manager ECU 130 (step S1200: NO), control moves to step S1250.

At step S1210, the corresponding detection and diagnostic program 141*c* contained in the database 141 is searched using the trouble information 141*b* as the key. As described above, at this stage, the failure history information and the vehicle information contained in the customer information 141*a* are also used to search the corresponding detection and diagnostic program 141*c*. Then, the corresponding detection and diagnostic program 141*c* is selected. When the selection completion notification, which notifies completion of the selection of the detection and diagnostic program 141*c*, is received, the vehicle manager ECU 130 executes the authentication process (S1140 in FIG. 9).

Thus, at step S1220, in response to the execution of the authentication process by the vehicle manager ECU 130, the customer server 140 carries out the authentication process with the vehicle manager ECU 130.

Upon the execution of the authentication process, if it is determined that the customer server 140 is legitimate (step S1150 in FIG. 9: YES), the vehicle manager ECU 130 requests the download of the detection and diagnostic program 141*c* to the customer server 140 (step S1160).

Then, at the next step S1230, it is determined whether the download of the detection and diagnostic program 141*c* has been requested from the vehicle manager ECU 130. If it is determined that the download of the detection and diagnostic program 141*c* has been requested (step S1230: YES), the customer server 140 transmits the corresponding detection and diagnostic program 141*c* to the vehicle manager ECU 130 at step S1240, and control moves to step S1250. On the other hand, if it is determines that the download of the detection and diagnostic program 141*c* has not been requested (step S1230: NO), control moves to step S1250 without executing step S1240.

At step S1250, it is determined whether the failure information has been transmitted from the vehicle manager ECU 130. This process corresponds to step S1190 of FIG. 9. When the failed part is identified (step S1180 in FIG. 9: YES), the vehicle manager ECU 130 transmits the failure information relevant to the failed part to the customer server 140. At this stage, if it is determined that the failure information has been transmitted (step S1250: YES), control moves to step S1260. On the other hand, if it is determined that the failure information has not been transmitted (step S1250: NO), the server side process is terminated without executing any of the following steps.

At step S1260, the failure information is stored in the database 141. This information corresponds to the failure information 141*d* of FIG. 8. Then, at the following step S1270, notification is carried out based on the failure information, and the server side process is terminated. The notification is transmitted to the contact specified in the contact information contained in the customer information 141*a*. For example, if a particular service station, to which a subject customer normally asks repair of his vehicle, is specified as the contact, the failure information is transmitted to this service station. For example, the notification can be an instruction for replacing the failed part, which is identified above.

Figure 11:
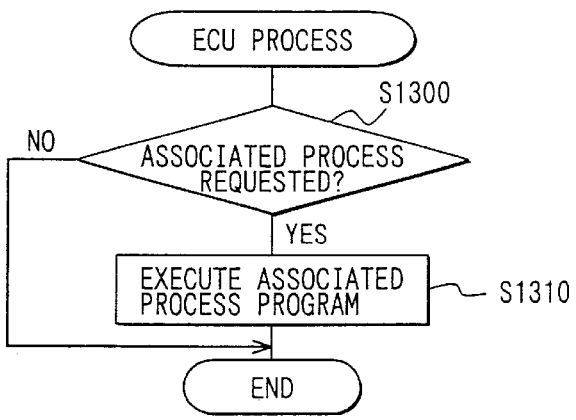
FIG. 11 is a flow chart showing an ECU process according to the second embodiment.

The process executed by each corresponding ECU 111–119 in response to the execution of the failure diagnosis process in the vehicle manager ECU 130 is referred to as the ECU process indicated in the flow chart of FIG. 11. This process is repeated at the predetermined time intervals in each corresponding ECU 111–119.

When the process starts, it is determined whether a command that requests execution of the associated process is received from the vehicle manager ECU 130 (step S1300). The command is outputted when the detection and diagnostic program 141*c* is executed by the vehicle manager ECU 130 (step S1170 in FIG. 9). As described above, the example of the command would be one that requests the transmission of the internal variable in the corresponding control operation. When the command that requests the execution of the associated process is received (step S1300: YES), the associated process is carried out in the corresponding ECU 111–119 (step S1310). Then, the ECU process is terminated. On the other hand, if the command that requests the execution of the associated process is not received (step S1300: NO), the ECU process is terminated without executing step S1310. When the associated process program, which is a program for carrying out the associated process, is executed, the information, such as the internal variable, is transmitted to the vehicle manager ECU 130. In the above description, the command that requests the transmission of the internal variable in the corresponding control operation is used as one example of the commands. However, these commands can be any commands that request transmission of variable information useful for identifying the failed part.

The advantages of the failure diagnostic system according to the present embodiment will be described.

In the failure diagnostic system of the present embodiment, the vehicle manager ECU 130 monitors the data of each ECU 111–119 in the in-vehicle networks 121–123 and determines whether the trouble of the vehicle exists currently based on the data (step S1110). That is, the existence of the trouble of the vehicle is determined based on the result data of the failure detection, which is obtained through the execution of the failure detection program in each corresponding ECU 111–119. The existence of the trouble of the vehicle is also determined based on the data, which is communicated between the ECUs 111–119 through the vehicle manager ECU 130. That is, the vehicle manager ECU 130 can detect not only the current trouble in the corresponding component through each ECU 111–119 but also the current trouble in the collaborative operation of the ECUs 111–119. Then, the detection and diagnostic program 141c, which corresponds to the current trouble, is obtained (step S1160), and the detection and diagnostic program 141c is executed. Thus, the associated process in each corresponding ECU 111–119 is carried out, and the information, such as the internal variable in the corresponding control operation, is transmitted to identify the failed part (step S1170). As a result, the failed part can be quickly identified.

Furthermore, in the failure diagnostic system of the present embodiment, when the failed part cannot be identified (S1180: NO), a new inquiry information is transmitted to the customer server 140 (step S1120), so that another detection and diagnostic program 141c is obtained from the customer server 140 and is executed (step S1160, S1170). Due to the fact that a single trouble can be caused by various factors, more than one detection and diagnostic program 141c is provided. Thus, the failed part is identified in a stepwise manner with use of the various detection and diagnostic programs 141c. For example, more than one detection and diagnostic program 141c can be prepared using a fault tree analysis (FTA) approach. In this way, a chance of identifying the failed part, which is involved in input and output of relatively complicated data between the ECUs 111–119, is increased, and it can contribute quicker identification of the failed part.

Furthermore, in the failure diagnostic system of the present embodiment, the customer server 140 is located outside of the vehicle, and the corresponding detection and diagnostic program 141c is obtained from the customer server 140 by transmitting the inquiry information, which includes the current trouble information, to the customer server 140 (step S1120 in FIG. 9). As a result, the storage capacity of each vehicle for storing the various data and the information can be reduced, and the appropriate detection and diagnostic program 141c can be used in each vehicle by frequently updating or renewing the database 141 of the customer server 140. Thus, the failed part can be appropriately identified.

Furthermore, the customer information 141a is stored in the customer server 140 (FIG. 8). The detection and diagnostic program 141c to be transmitted to the vehicle manager ECU 130 is selected based on the failure history information and the vehicle information contained in the customer information 141a (step S1210 in FIG. 10). Thus, a chance of selecting the appropriate detection and diagnostic program is increased, and thus the failed part can be more quickly identified.

Also, the customer information 141a includes the identification information for identifying the user who is the subscriber of the service. Thus, the data communication link is established with the vehicle manager ECU 130 with use of the identification information. As a result, it is possible to prevent unauthorized access from non-subscribing users who do not subscribe the service. On the other hand, the vehicle manager ECU 130 carries out the authentication process with the customer server 140 (step S1140 in FIG. 9 and step S1220 in FIG. 10) before the download of the detection and diagnostic program 141c and determines whether the customer server 140 is legitimate (step S1150 in FIG. 9). Thus, it is possible to prevent the download of the illegitimate program to the vehicle manager ECU 130 from the customer server 140. As a result, it is possible to avoid occurrence of a critical condition that could jeopardize safety drive of the vehicle.

Furthermore, in the failure diagnostic system of the present embodiment, when the vehicle manager ECU 130 identifies the failed part (step S1180 in FIG. 9: YES), the failure information relevant to the failed part is transmitted to the customer server 140 (step S1190). In turn, when the customer server 140 receives the failure information (step S1250 in FIG. 10: YES), the failure information is stored in the database 141 (S1260) and is accumulated as the failure information 141d (FIG. 8). Thus, creation of the detection and diagnostic programs 141c and update of the detection and diagnostic programs 141c are eased with use of the failure information 141d. That is, the efficiency for creating the detection and diagnostic programs 141c is further improved.

In addition, the customer server 140 not only stores the failure information but also carries out the notification based on the failure information (step S1270 in FIG. 10). For example, the service station can be informed of the failed part, which needs to be replaced, in advance through the customer server 140. In this way, when the user arrives at the notified service station, the user can get faster replacement service for the failed part from the service station.

The present invention is not limited to the above embodiment, and the above embodiment can be modified as follows without departing from the spirit and scope of the invention.

(I) In the above embodiment, the program, which is executed in the vehicle side, is downloaded from the customer server 140, so that the vehicle side program can be easily updated.

Figure 12:
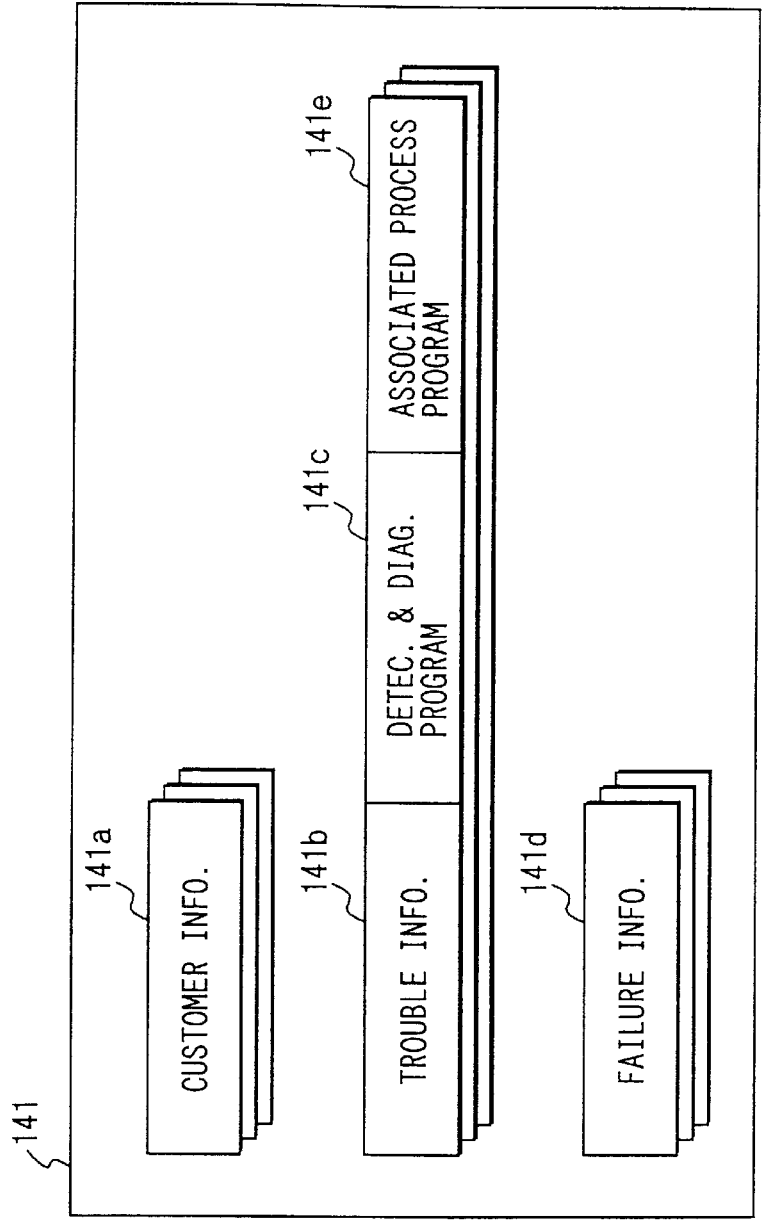
FIG. 12 is a schematic view showing a modification of the information in the database of the customer server according to the second embodiment.

With respect to this point, the associated process programs executed in the ECUs 111–119 can be stored in the database 141 of the customer server 140 and can be downloaded by the vehicle manager ECU 130 along with the detection and diagnostic program 141c as shown in FIG. 12. Then, the associated process programs are transmitted from the vehicle manager ECU 130 to the corresponding ECUs 111–119. That is, only it is required to provide a storage space in each ECU 111–119 for storing the associated process program. Particularly, as shown in FIG. 12, if each detection and diagnostic program 141c is linked with the corresponding associated process program 141e, the corresponding associated process, which corresponds to the detection and diagnostic program 141c, can be carried out, allowing identification of a wider range of failed parts.

(II) In the above embodiment, the detection and diagnostic program 141c is downloaded each time it is determined that a trouble currently exists in the vehicle.

However, when the failure information 141d stored in the database 141 of the customer server 140 is statistically analyzed, the frequently encountered troubles can be specified. Thus, the detection and diagnostic programs 141c, which correspond to the frequently encountered troubles, can be pre-downloaded from the customer server 140 to the vehicle manager ECU 130. To reduce a communication cost for downloading the programs from the customer server 140 to the vehicle manager ECU 130, the programs can be downloaded from the customer server 140 along with other data, such as map data or search data used in the navigation ECU 114 for guiding the vehicle along the route to the destination. In some cases, when the detection and diagnostic programs 141c specifically prepared for the frequently encountered troubles are pre-downloaded, the corresponding detection and diagnostic program 141c can be immediately executed in the vehicle manager ECU 130 upon the occurrence of the trouble, allowing faster identification of the failed part.

(III) Furthermore, in the above embodiment, as long as the failed part is not identified (step S1180 in FIG. 9: NO), the detection and diagnostic program 141c is downloaded one after the other (S1160). However, it could happen that the failed part cannot be identified even with the various detection-diagnostic programs 141c. Thus, if the failed part cannot be identified with the predetermined number of the detection and diagnostic programs 141c, or if the failed part cannot be identified with a series of detection and diagnostic programs 141c, the information accumulated in the vehicle side can be transmitted to the customer server 140 to ask for an expert opinion.

Figure 13:
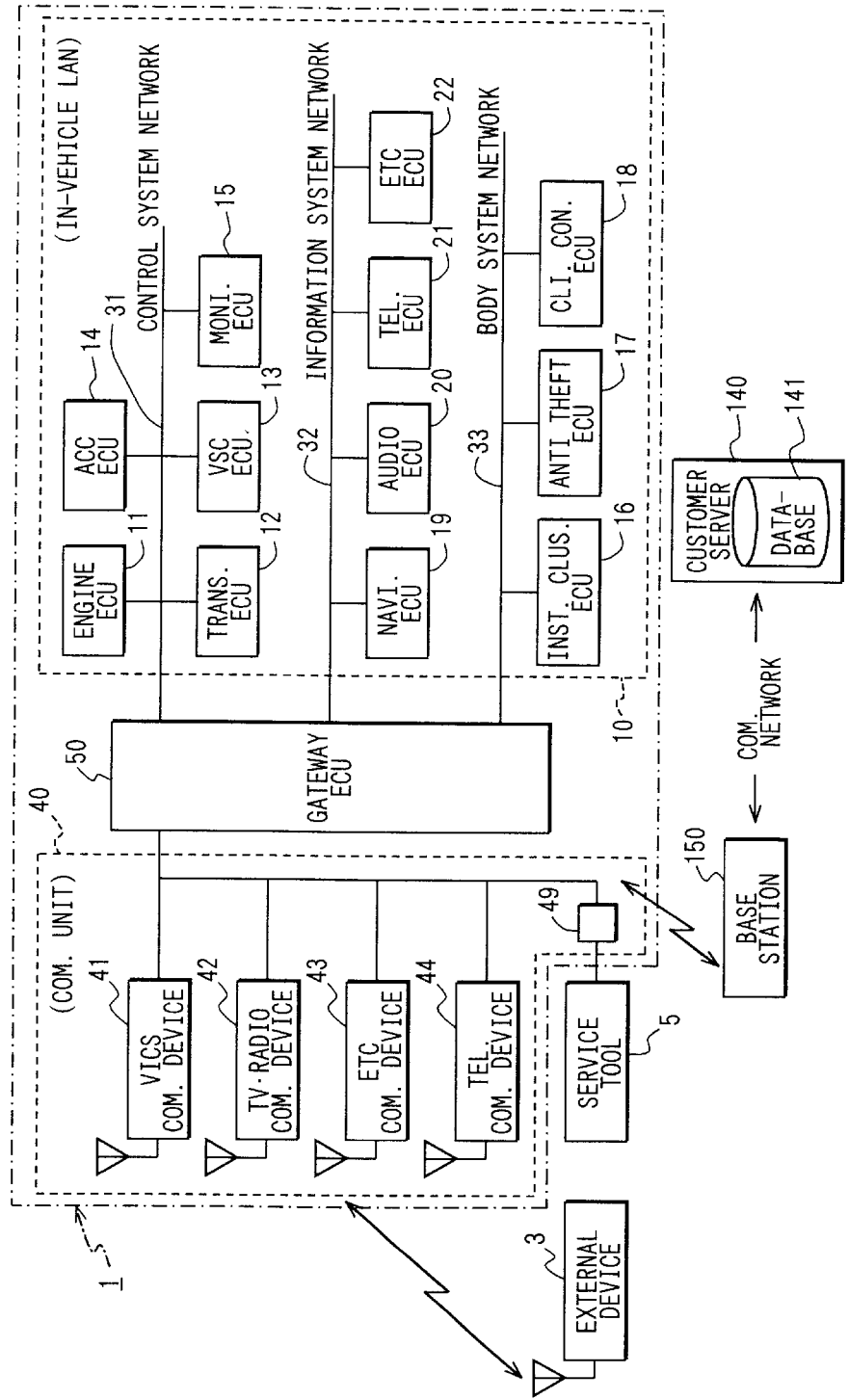
FIG. 13 is a block diagram showing a modification of the structure of the in-vehicle communication system of the first embodiment.

(IV) With reference to FIG. 13, the gateway ECU 50 of the first embodiment can be modified to have the functions similar to those of the vehicle manager ECU 130 of the second embodiment. In such a case, the gateway ECU 50 communicates with the customer server 140, which acts as an external device corresponding to the external device 3 of the first embodiment, through the communication unit 40 and the base station 150 in a manner similar to that described above in connection with the vehicle manager ECU 130 in the second embodiment. In this way, the advantages discussed with reference to the second embodiment can be added in the first embodiment.

Additional advantages and modifications will readily occur to those skilled in the art. The invention in its broader terms is therefore, not limited to the specific details, representative apparatus, and illustrative examples shown and described.

What is claimed is:

1. A vehicular relay device, which is located between an in-vehicle LAN and a communication device that performs data communication with an external device located outside of a vehicle, wherein the in-vehicle LAN is arranged in the vehicle and is connected with a plurality of in-vehicle electronic devices, and the vehicular relay device relays communication between the external device and the in-vehicle electronic devices, the vehicular relay device comprising:
   a first identifying means, which identifies a requested in-vehicle electronic device from the in-vehicle electronic devices based on an access request for requesting access to the requested in-vehicle electronic device upon reception of the access request from the external device and determines whether the access request requires authentication of the external device based on a result of identification of the requested in-vehicle electronic device;
   a first authenticating means, which determines whether the external device has been authorized to access the in-vehicle electronic devices based on first authentication information, which is transmitted from the external device, when the first identifying means determines that the access request requires the authentication of the external device; and
   a first delivering means, which delivers communication data transmitted from the external device through the communication device to the requested in-vehicle electronic device when the first authenticating means determines that the external device has been authorized to access the in-vehicle electronic devices or when the first identifying means determines that the access request requires no authentication of the external device.

2. A vehicular relay device according to claim 1, wherein:
   the in-vehicle electronic devices connected to the in-vehicle LAN include at least one information system electronic device and at least one control system electronic device, wherein the at least one information system electronic device is used for providing external information, which is obtained from outside the vehicle, to a passenger of the vehicle, and the at least one control system electronic device is used for controlling the vehicle;
   the first identifying means determines whether the access request requires the authentication of the external device by determining whether the requested in-vehicle electronic device is one of the at least one information system electronic device or one of the at least one control system electronic device when the access request is received from the external device; and
   the first authentication means determines whether the external device has been authorized to access the in-vehicle electronic devices based on the first authentication information when the first identifying means determines that the requested in-vehicle electronic device is the one of the at least one control system electronic device.

3. A vehicular relay device according to claim 1, further comprising:
   a second identifying means, which determines whether the access request is a write request for writing one of a program and a parameter in the requested in-vehicle electronic device when the access request is received from the external device, wherein the program operates in the requested in-vehicle electronic device, and the parameter is used in operation of the requested in-vehicle electronic device;
   a second authenticating means, which actuates the first identifying means when the second identifying means determines that the access request is not the write request, and the second authenticating means determines whether the external device has been authorized to write the one of the program and the parameter in the requested in-vehicle electronic device based on second authentication information transmitted from the external device when the second identifying means determines that the access request is the write request; and
   a second delivering means, which delivers the communication data transmitted from the external device through the communication device to the requested in-vehicle electronic device only when the second authenticating means determines that the external device has been authorized to write the one of the program and the parameter in the requested in-vehicle electronic device.

4. A vehicular relay device according to claim 3, wherein:
   the second authenticating means determines whether the external device has been authorized to access the in-vehicle electronic devices based on the first authentication information when the second identifying means determines that the access request is the write request; and
   the second authenticating means determines whether the external device has been authorized to write the one of the program and the parameter in the requested in-vehicle electronic device based on the second authentication information when the second authenticating means determines that the external device has been authorized to access the in-vehicle electronic devices.

5. A vehicular relay device according to claim 4, wherein:
the second authenticating means determines whether the external device has been authorized to access the in-vehicle electronic devices by verifying whether the first authentication information is identical with authentication information stored in the second authenticating means;
the second authenticating means transfers the second authentication information to the requested in-vehicle electronic device and commands the requested in-vehicle electronic device to verify whether the second authentication information is identical with authentication information stored in the requested in-vehicle electronic device when the second authenticating means determines that the external device has been authorized to access the in-vehicle electronic devices;
the second authenticating means obtains a result of verifying whether the second authentication information is identical with the authentication information stored in the requested in-vehicle electronic device; and
the second authenticating means determines whether the external device has been authorized to write the one of the program and the parameter in the requested in-vehicle electronic device based on the result of verifying whether the second authentication information is identical with the authentication information stored in the requested in-vehicle electronic device.

6. A vehicular relay device according to claim 1, wherein:
each in-vehicle electronic device stores a failure detection program that is executed to detect a failure of the vehicle during control operation of a controlled apparatus controlled by the in-vehicle electronic device;
the vehicular relay device communicates with the in-vehicle electronic devices through the in-vehicle LAN to manage the failure of the vehicle; and
the vehicular relay device further comprises:
a trouble determining means for determining whether a trouble of the vehicle currently exists based on data transmitted from each in-vehicle electronic device through the in-vehicle LAN;
a program obtaining means for obtaining a corresponding detection and diagnostic program corresponding to the current trouble when the trouble determining means determines that the trouble of the vehicle currently exists, wherein the corresponding detection and diagnostic program is previously prepared to handle the current trouble;
a failed part identifying means for identifying a failed part, which causes the current trouble in the vehicle, based on information transmitted from each corresponding in-vehicle electronic device by executing the corresponding detection and diagnostic program obtained by the program obtaining means, wherein the execution of the corresponding detection and diagnostic program, in turn, causes execution of an associated process in each corresponding in-vehicle electronic device, so that the information is outputted from each corresponding in-vehicle electronic device to the failed part identifying means; and
an information outputting means for outputting failure information relevant to the failed part based on a result obtained through operation of the failed part identifying means.

7. An in-vehicle communication system comprising:
an in-vehicle LAN, which is arranged in a vehicle and is connected with a plurality of in-vehicle electronic devices;
a communication device that performs data communication with an external device located outside of the vehicle; and
a vehicular relay device, which is located between the communication device and the in-vehicle LAN and relays communication between the external device and the in-vehicle electronic devices, wherein the vehicular relay device including:
a first identifying means, which identifies a requested in-vehicle electronic device from the in-vehicle electronic devices based on an access request for requesting access to the requested in-vehicle electronic device upon reception of the access request from the external device and determines whether the access request requires authentication of the external device based on a result of identification of the requested in-vehicle electronic device;
a first authenticating means, which determines whether the external device has been authorized to access the in-vehicle electronic devices based on first authentication information, which is transmitted from the external device, when the first identifying means determines that the access request requires the authentication of the external device; and
a first delivering means, which delivers communication data transmitted from the external device through the communication device to the requested in-vehicle electronic device when the first authenticating means determines that the external device has been authorized to access the in-vehicle electronic devices or when the first identifying means determines that the access request requires no authentication of the external device.

8. An in-vehicle communication system according to claim 7, wherein:
each in-vehicle electronic device stores a failure detection program that is executed to detect a failure of a vehicle during control operation of a controlled apparatus controlled by the in-vehicle electronic device;
the vehicular relay device communicates with the in-vehicle electronic devices through the in-vehicle LAN to manage the failure of the vehicle; and
the vehicular relay device further including:
a trouble determining means for determining whether a trouble of the vehicle currently exists based on data transmitted from each in-vehicle electronic device through the in-vehicle LAN;
a program obtaining means for obtaining a corresponding detection and diagnostic program corresponding to the current trouble when the trouble determining means determines that the trouble of the vehicle currently exists, wherein the corresponding detection and diagnostic program is previously prepared to handle the current trouble;
a failed part identifying means for identifying a failed part, which causes the current trouble in the vehicle, based on information transmitted from each corresponding in-vehicle electronic device by executing the corresponding detection and diagnostic program obtained by the program obtaining means, wherein the execution of the corresponding detection and diagnostic program, in turn, causes execution of an associated process in each corresponding in-vehicle electronic device, so that the information is outputted from each corresponding in-vehicle electronic device to the failed part identifying means; and an information outputting means for outputting failure information relevant to the failed part based on a result obtained through operation of the failed part identifying means.

9. A failure diagnostic system comprising:

a plurality of electronic control devices, which are interconnected through an in-vehicle network, wherein each electronic control device stores a failure detection program, which is executed to detect a failure of a vehicle during control operation of a controlled apparatus controlled by the electronic control device; and a vehicle management device, which communicates with the electronic control devices through the in-vehicle network to manage the failure of the vehicle, wherein the vehicle management device includes:

a trouble determining means for determining whether a trouble of the vehicle currently exists based on data transmitted from each electronic control device through the in-vehicle network;

a program obtaining means for obtaining a corresponding detection and diagnostic program corresponding to the current trouble when the trouble determining means determines that the trouble of the vehicle currently exists, wherein the corresponding detection and diagnostic program is previously prepared to handle the current trouble;

a failed part identifying means for identifying a failed part, which causes the current trouble in the vehicle, based on information transmitted from each corresponding electronic control device by executing the corresponding detection and diagnostic program obtained by the program obtaining means, wherein the execution of the corresponding detection and diagnostic program, in turn, causes execution of an associated process in each corresponding electronic control device, so that the information is outputted from each corresponding electronic control device to the failed part identifying means; and an information outputting means for outputting failure information relevant to the failed part based on a result obtained through operation of the failed part identifying means.

10. A failure diagnostic system according to claim 9, wherein the data transmitted from each electronic control device through the in-vehicle network is outputted from each electronic control device to the vehicle management device upon execution of the failure detection program in each electronic control device.

11. A failure diagnostic system according to claim 9, wherein the data transmitted from each electronic control device through the in-vehicle network is further transmitted through at least one of the followings:

a path between the electronic control devices via the vehicle management device; and a path between the vehicle management device and one of the electronic control devices.

12. A failure diagnostic system according to claim 9, wherein the failed part identifying means requests the program obtaining means to obtain another detection and diagnostic program when the failed part cannot be identified with the previously obtained detection and diagnostic program.

13. A failure diagnostic system according to claim 9, further comprising a server device, which is located outside of the vehicle and is capable of data communication with the vehicle management device, wherein the server device includes a storage means for storing the corresponding detection and diagnostic program, and the program obtaining means of the vehicle management device obtains the corresponding detection and diagnostic program from the server device.

14. A failure diagnostic system according to claim 13, wherein:

the program obtaining means of the vehicle management device transmits inquiry information, which contains current trouble information indicative of the current trouble, to the server device;

the storage means of the server device stores a plurality of detection and diagnostic programs each linked to its relevant trouble information, and the corresponding detection and diagnostic program is one of the detection and diagnostic programs and is linked with the current trouble information; and the server device searches for the corresponding detection and diagnostic program stored in the storage means based on the current trouble information and transmits the corresponding detection and diagnostic program to the vehicle management device when the inquiry information is received from the program obtaining means.

15. A failure diagnostic system according to claim 14, wherein:

the server device further stores customer information in the storage means, wherein the customer information is prepared for each user; and the server device transmits the corresponding detection and diagnostic program to the vehicle management device based on the customer information when the inquiry information is received from the program obtaining means of the vehicle management device.

16. A failure diagnostic system according to claim 13, wherein the program obtaining means of the vehicle management device performs authentication process for determining whether the server device is legitimate before the corresponding detection and diagnostic program is received from the server device.

17. A failure diagnostic system according to claim 13, wherein:

the program obtaining means of the vehicle management device obtains an associated process program, which executes the associated process in each corresponding electronic control device, from the server device and transmits the associated process program to each corresponding electronic control device; and each corresponding electronic control device stores the associated process program received from the vehicle management device.

18. A failure diagnostic system according to claim 13, wherein:

the information outputting means of the vehicle management device transmits the failure information to the server device based on the result obtained through the operation of the failed part identifying means; and the server device stores the failure information in the storage means.

19. A failure diagnostic system according to claim 18, wherein the server device transmits externally a notification based on the failure information.

20. A failure diagnostic system according to claim 13, wherein the program obtaining means is capable of obtaining the corresponding detection and diagnostic program before the trouble determining means determines that the trouble of the vehicle currently exists.

21. A failure diagnostic system according to claim 20, wherein the program obtaining means of the vehicle management device obtains the corresponding detection and diagnostic program when other data other than the detection and diagnostic program is transmitted from the server device such that the corresponding detection and diagnostic program is transmitted to the vehicle management device along with the other data.

22. A vehicle management device, which is used together with a plurality of electronic control devices, which are interconnected through an in-vehicle network, wherein each electronic control device stores a failure detection program, which is executed to detect a failure of a vehicle during control operation of a controlled apparatus controlled by the electronic control device, and the vehicle management device communicates with the electronic control devices through the in-vehicle network to manage the failure of the vehicle, the vehicle management device comprising:

a trouble determining means for determining whether a trouble of the vehicle currently exists based on data transmitted from each electronic control device through the in-vehicle network;

a program obtaining means for obtaining a corresponding detection and diagnostic program corresponding to the current trouble when the trouble determining means determines that the trouble of the vehicle currently exists, wherein the corresponding detection and diagnostic program is previously prepared to handle the current trouble;

a failed part identifying means for identifying a failed part, which causes the current trouble in the vehicle, based on information transmitted from each corresponding electronic control device by executing the corresponding detection and diagnostic program obtained by the program obtaining means, wherein the execution of the corresponding detection and diagnostic program, in turn, causes execution of an associated process in each corresponding electronic control device, so that the information is outputted from each corresponding electronic control device to the failed part identifying means; and an information outputting means for outputting failure information relevant to the failed part based on a result obtained through operation of the failed part identifying means.

23. A server device, which constitutes part of a failure diagnostic system, wherein the failure diagnostic system also includes a plurality of electronic control devices and a vehicle management device, wherein the electronic control devices are interconnected through an in-vehicle network, and each electronic control device stores a failure detection program, which is executed to detect a failure of a vehicle during control operation of a controlled apparatus controlled by the electronic control device, and the vehicle management device communicates with the electronic control devices through the in-vehicle network to manage the failure of the vehicle, the server device comprising:

a storage means, which stores a plurality of detection and diagnostic programs each linked to its relevant trouble information indicative of one of troubles of the vehicle, wherein when an inquiry information, which includes current trouble information indicative of a current trouble of the vehicle, is received from the vehicle management device, the server device searches for a corresponding detection and diagnostic program stored in the storage means based on the current trouble information and transmits the corresponding detection and diagnostic program to the vehicle management device, and the vehicle management device executes the corresponding detection and diagnostic program to cause execution of an associated process in each corresponding electronic control device, so that information is outputted from each corresponding electronic control device to the vehicle management device, and a failed part, which causes the current trouble of the vehicle, is identified by the vehicle management device based on the information of each corresponding electronic control device.

24. A detection and diagnostic program executed in a vehicle management device, which constitutes part of a failure diagnostic system, wherein the failure diagnostic system also includes a plurality of electronic control devices, which are interconnected through an in-vehicle network, wherein each electronic control device stores a failure detection program, which is executed to detect a failure of a vehicle during control operation of a controlled apparatus controlled by the electronic control device, and the vehicle management device communicates with the electronic control devices through the in-vehicle network to manage the failure of the vehicle, the detection and diagnostic program comprising instructions for:

executing an associated process in each corresponding electronic control device, so that information is outputted from each corresponding electronic control device to the vehicle management device; and identifying a failed part of the vehicle based on the information of each corresponding electronic control device.

* * * * *